United States Patent [19]
Woodrum

[11] 4,086,628
[45] Apr. 25, 1978

[54] DIRECTORY GENERATION SYSTEM HAVING EFFICIENCY INCREASE WITH SORTED INPUT

[75] Inventor: Luther Jay Woodrum, Poughkeepsie, N.Y.

[73] Assignee: International Business Machines Corporation, Armonk, N.Y.

[21] Appl. No.: 415,090

[22] Filed: Nov. 12, 1973

Related U.S. Application Data

[63] Continuation of Ser. No. 197,415, Nov. 10, 1971, abandoned.

[51] Int. Cl.² .......................... G06F 7/22; G06F 7/10
[52] U.S. Cl. .................................................... 364/200
[58] Field of Search ...................... 340/172.5; 444/1; 369/200, 300, 900

[56] References Cited

U.S. PATENT DOCUMENTS

| | | | |
|---|---|---|---|
| 3,388,381 | 6/1968 | Prywes et al. | 340/172.5 |
| 3,551,895 | 12/1970 | Driscoll, Jr. | 364/200 |
| 3,579,194 | 5/1971 | Weinblatt | 340/172.5 |
| 3,614,745 | 10/1971 | Podrin et al. | 340/172.5 |
| 3,614,746 | 10/1971 | Klinkhamer | 340/172.5 |
| 3,647,226 | 2/1972 | Loizides et al. | 340/172.5 |
| 3,651,483 | 3/1972 | Clark et al. | 340/172.5 |
| 3,678,461 | 7/1972 | Choate et al. | 364/200 |
| 3,716,840 | 2/1973 | Masten et al. | 364/200 |
| 3,878,513 | 4/1975 | Werner | 364/200 |
| 3,889,243 | 6/1975 | Drimak | 364/200 |
| 3,916,387 | 10/1975 | Woodrum | 364/200 |

*Primary Examiner*—Gareth D. Shaw
*Assistant Examiner*—Jan E. Rhoads
*Attorney, Agent, or Firm*—Bernard M. Goldman

[57] ABSTRACT

A system tool for electronically generating a machine directory entity having a binary tree relationship. The method generates the directory entity directly from a sequence of input keys without using an intermediate stack. The input key sequence may be sorted or unsorted; but if sorted (whether ascending or descending), the system tool is made more efficient. The directory entity is used by the machine to address objects which may be found within the confines of the machine.

Unique connectors called invertible edges, are generated in the machine organization of the directory entity being generated.

4 Claims, 23 Drawing Figures

SUBTRACTION INVERTIBLE EDGES IN A BINARY TREE

SUBTRACTION INVERTIBLE EDGES IN A BINARY TREE

A TYPICAL INNER VERTEX ROW C IN MEMORY m

FIG. 4A  BEFORE
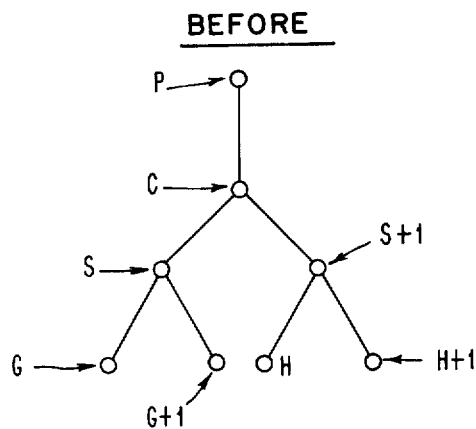
FIG. 4B  AFTER
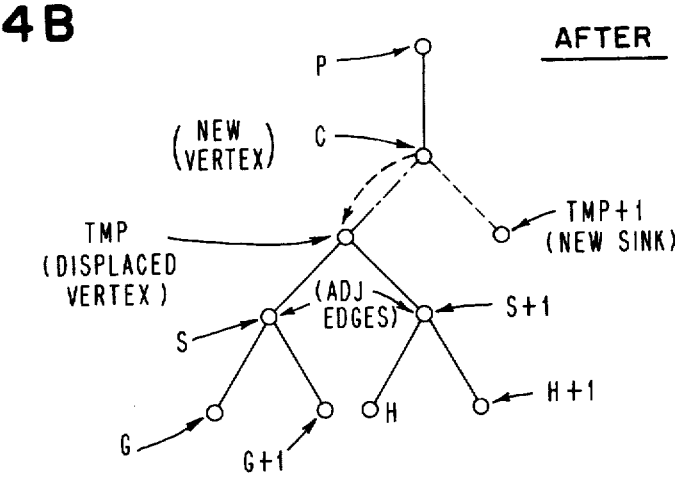
FIG. 5
| ASSIGNED SUCCESSOR PAIR SPACE | |
|---|---|
| TMP → | DISPLACED VERTEX |
| TMP+1 → | NEW SINK |

FIG. 7A

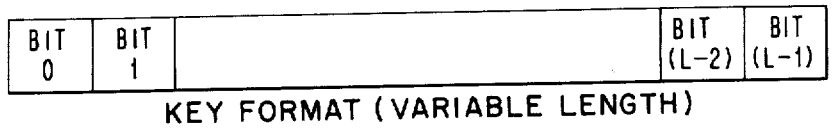

KEY FORMAT (VARIABLE LENGTH)

FIG. 7B

INPUT SEQUENCE OF KEYS

FIG. 8

| | FIELD / REGS |
|---|---|
| DAR | ADDRESS OF DIRECTORY |
| P | PREDECESSOR VERTEX ADDRESS |
| C | CURRENT VERTEX ADDRESS |
| S | SUCCESSOR VERTEX ADDRESS |
| KEY0 | LENGTH \| 1ST KEY |
| ADR0 | ADDRESS OF KEY0'S RECORD |
| KEY1 | LENGTH \| 2ND KEY |
| ADR1 | ADDRESS OF KEY1'S RECORD |
| D | NEW D-INDEX |
| BIT | VALUE OF BIT AT D INDEX IN KEY1 |
| TMP | TEMPORARY REGISTER |
| ALT | ADDRESS OF ROW PAIRED WITH SNK |
| SNK | ADDRESS OF NEW SINK ROW |
| G | ADDR. OF L-SR OF DISP. VERT. |
| H | ADDR. OF R-SR OF DISP. VERT. |

FIG. 9

| ADDRESS | MATRIX Z | | | | | |
|---|---|---|---|---|---|---|
| | #SINKS FIELD | | SPACE CHAIN FIELD | | | |
| DAR+0 | 0 | 1 | 2 | 3 | 4 | 5 |
| DAR+1 | D | $t_0$ | $c_0$ | $t_1$ | $c_1$ | ± EDGE |
| ⋮ | | | | | | |
| TMP | | | | | | |
| TMP+1 | | | | | | |
| ⋮ | | | | | | |
| DAR+(2N-1) | | | | | | |

LEGEND

TMP IS ROW ADDRESS FOR LEFT SUCCESSOR AND TMP+1 IS ROW ADDRESS FOR PAIRED RIGHT SUCCESSOR IN ASSIGNED SUCCESSOR PAIR SPACE

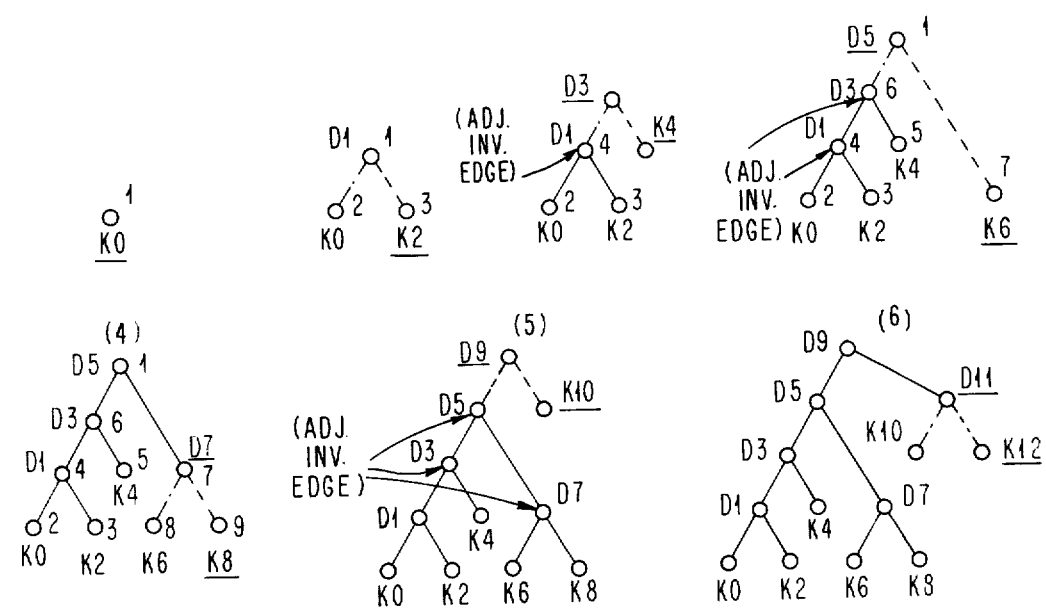
FIG. 10A
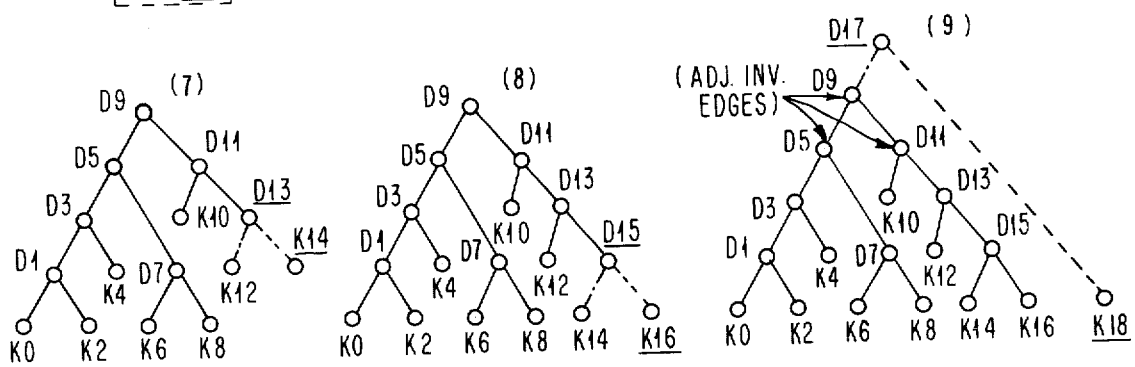

FIG.10B
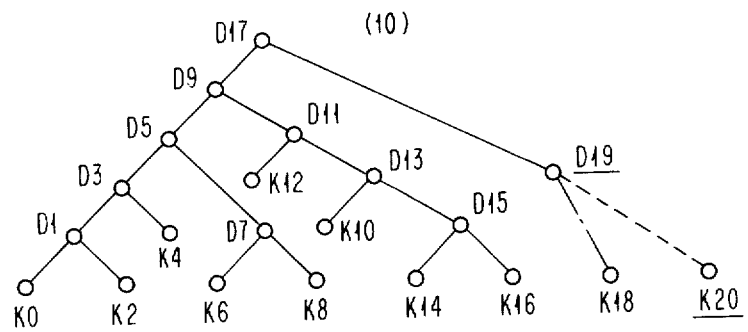
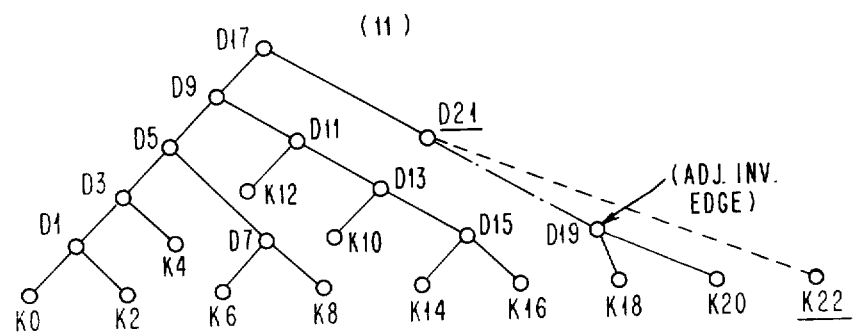
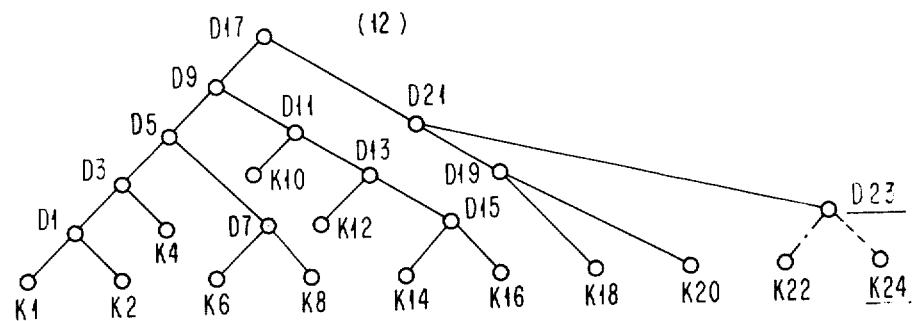
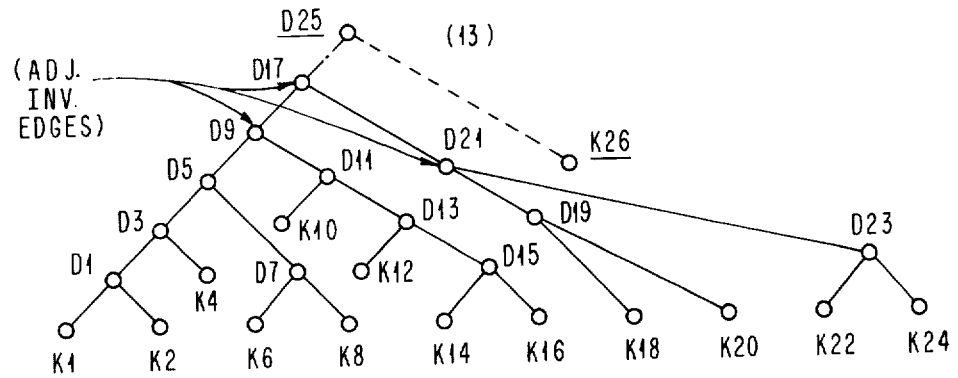

FIG.10C
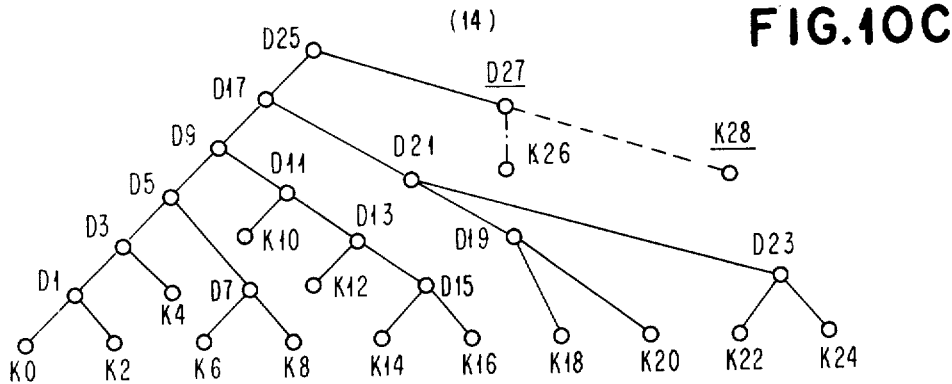
(14)
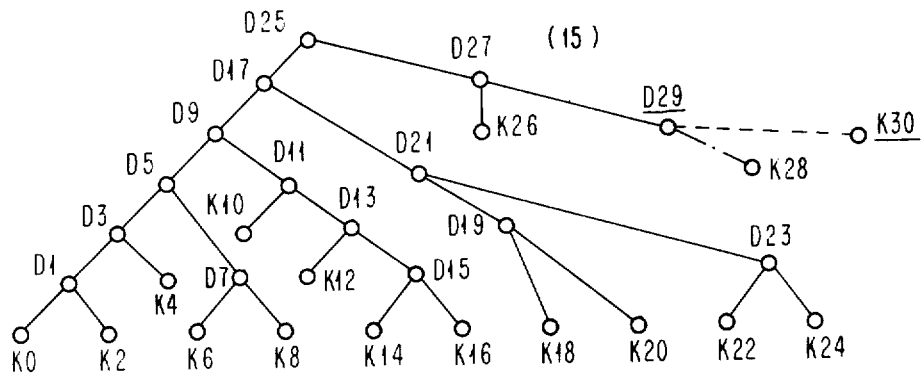
(15)
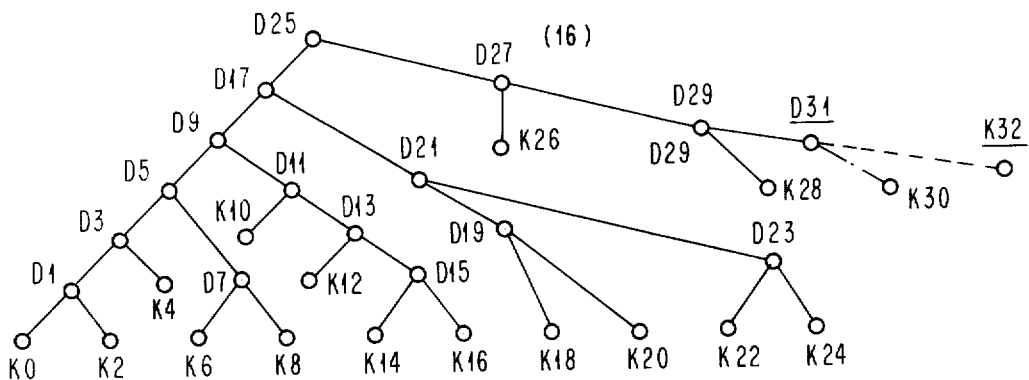
(16)
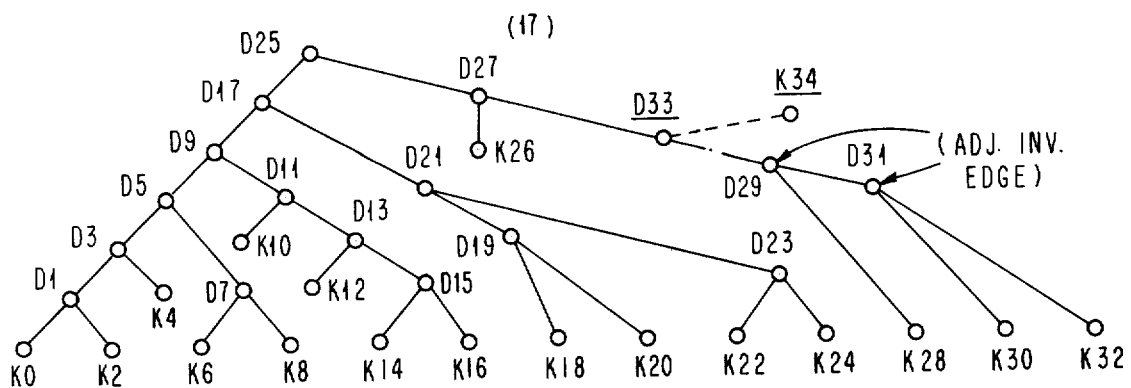
(17)

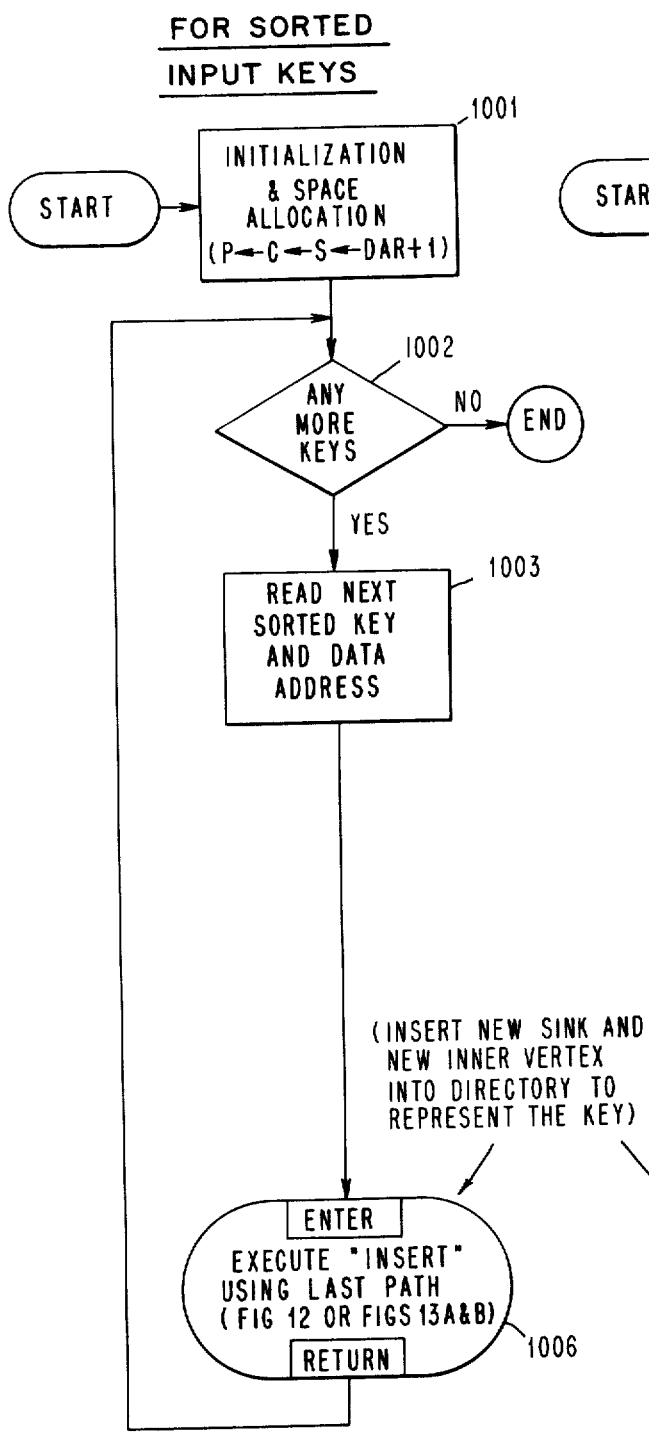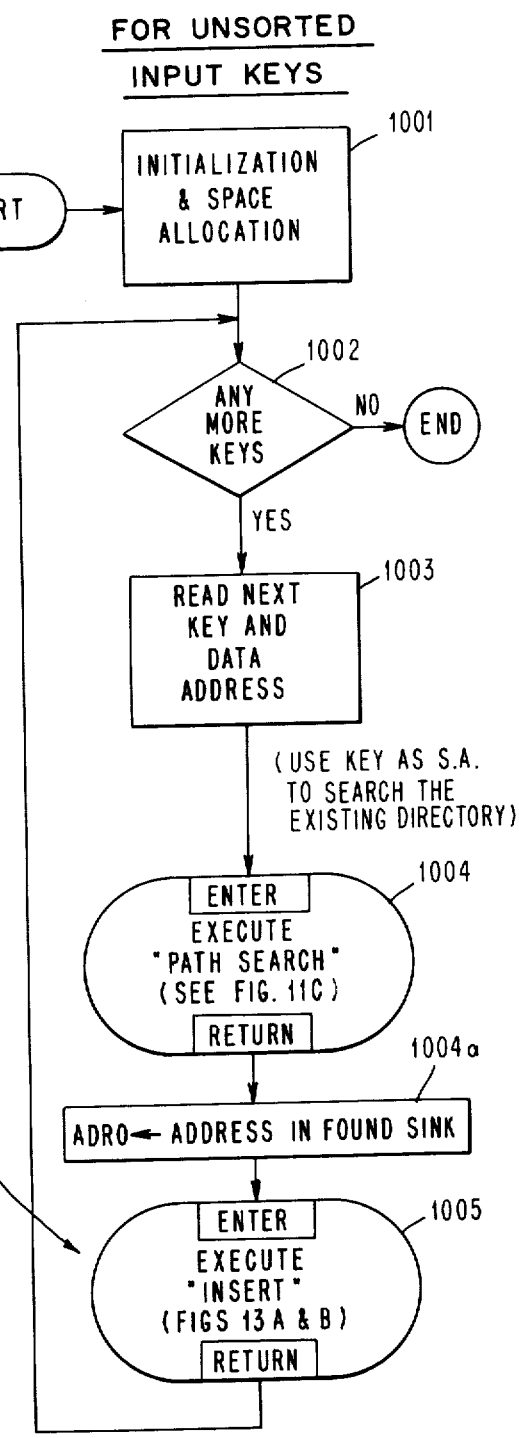

FIG. 11C    PATH SEARCH METHOD 1004
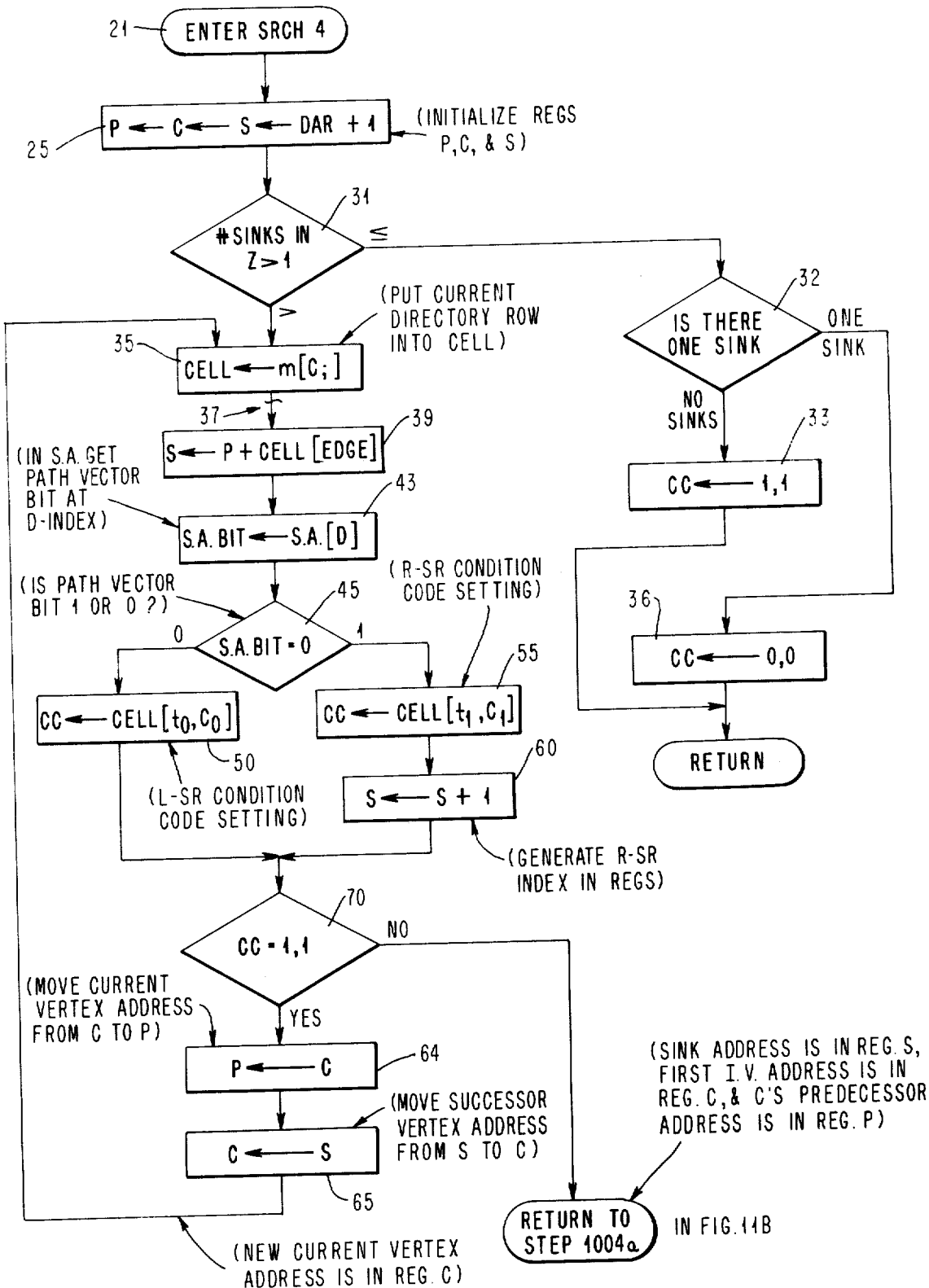

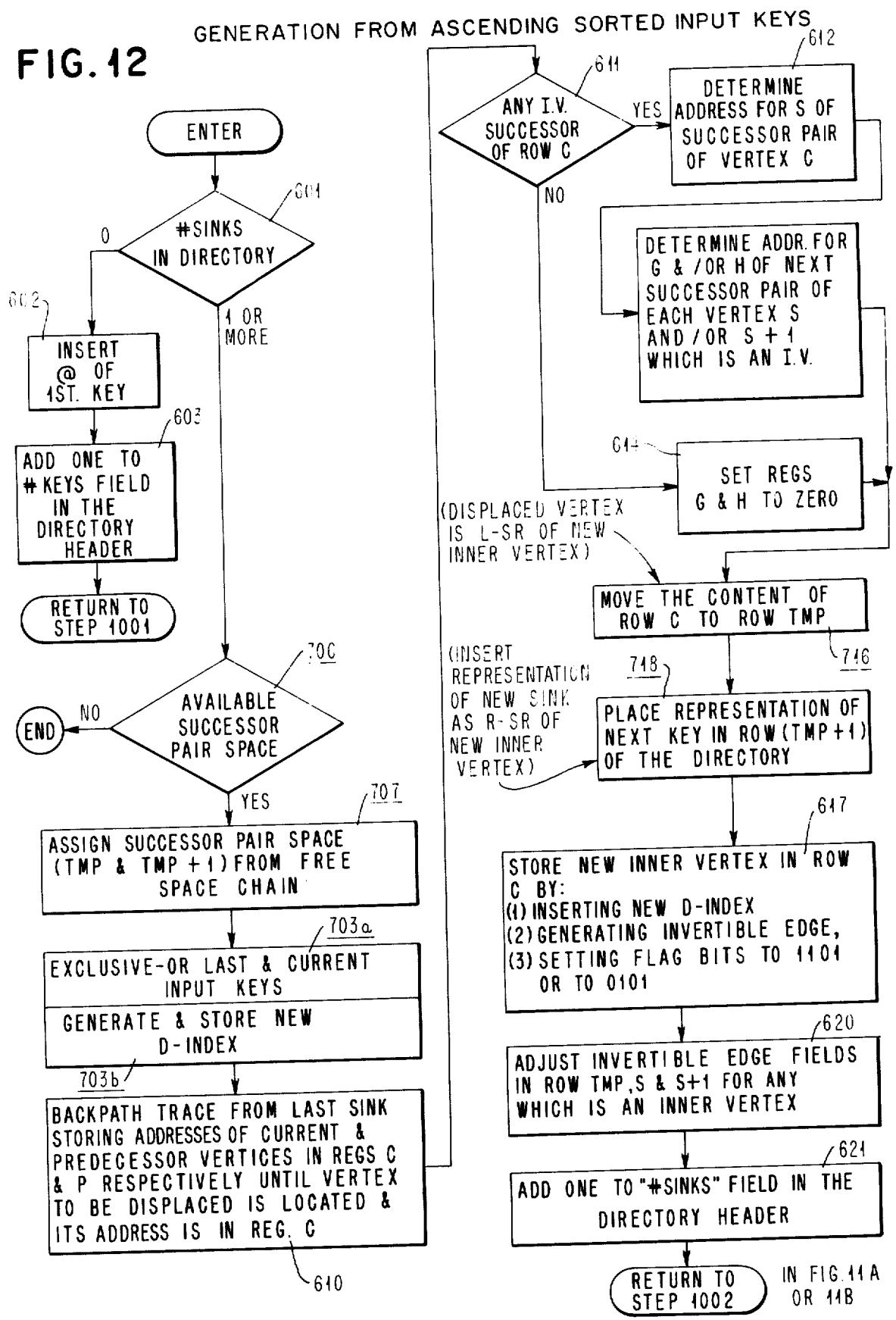
FIG. 12 — GENERATION FROM ASCENDING SORTED INPUT KEYS

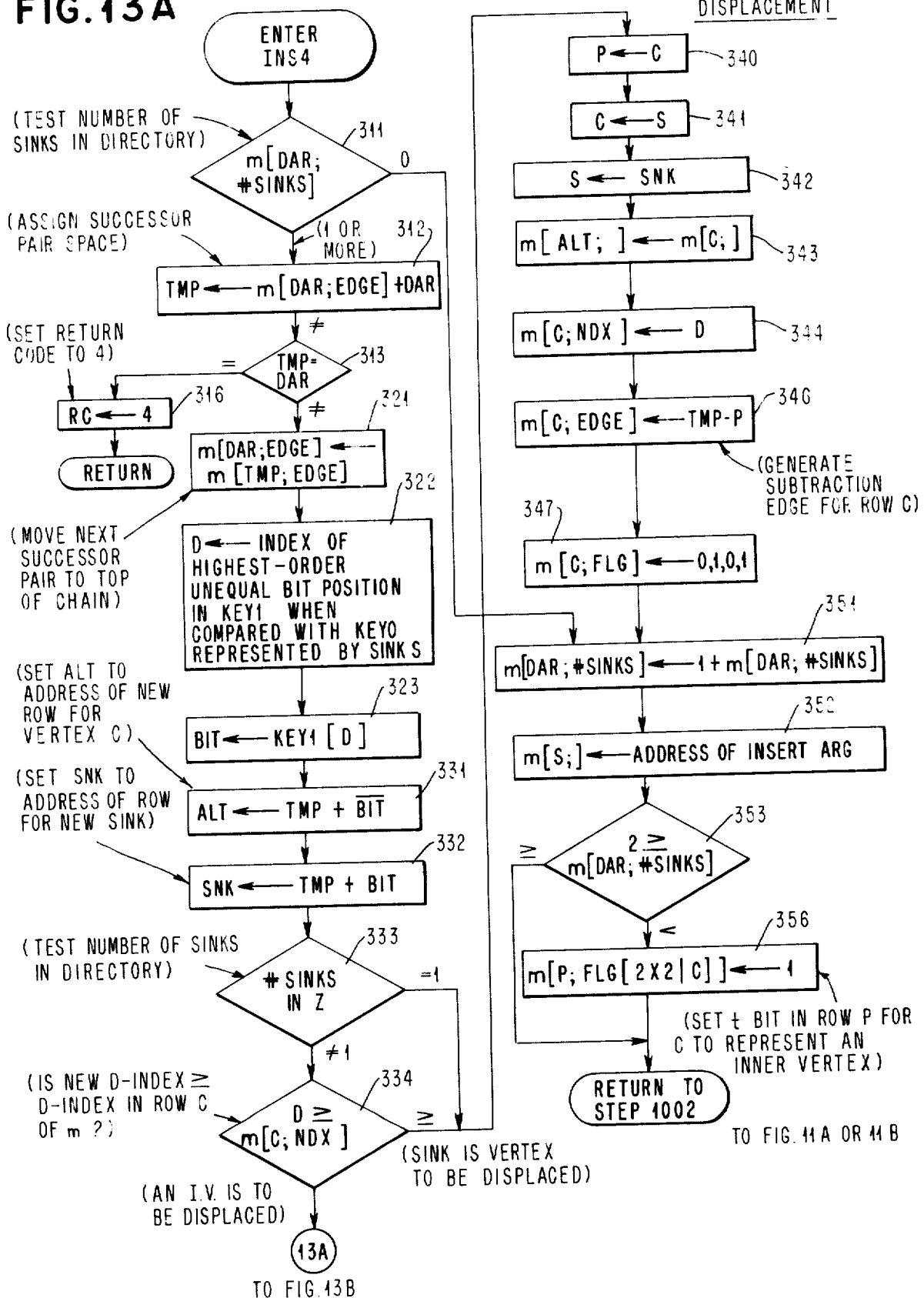

DIRECTORY GENERATION SYSTEM HAVING EFFICIENCY INCREASE WITH SORTED INPUT

This is a continuation of application Ser. No. 197,415 filed Nov. 10, 1971, and now abandoned.

TABLE OF CONTENTS

Abstract
Introduction
Prior Art
Utility
Features and Objects
Drawing Description
Definition Table
General Binary Tree Relationships
General Description of Directory
System Configuration
Matrix Form and Terminology
Subtraction Invertible Edge Representations
Content of a Sink Row
Basic Directory Generation by Insertion Method
Basic Generation Method Summary for Sorted Keys
General-Generation Method
Insertion Method for Efficiently Handling Sorted Keys
Detailed Flow Diagrams of Generation Method
I/O Storing of Directory
Claims

INTRODUCTION

The subject invention controls stored electrical or magnetic signals and machine states.

PRIOR ART

Background is found in such works as "Fundamental Algorithms, The Art of Computer Programming" by D. E. Knuth published in 1968 by Addison-Wesley Publishing Company, "Proof Techniques in Graph Theory" by Frank Harary, published by Academic Press, and "A Programming Language" by K. E. Iverson published by Wiley, all of which are widely being taught in many universities to students working toward B. S. degrees in Computing Science; therefore they must be considered to represent the current average skill-in-the-art knowledge in the digital computer arts.

The terminology used in this specification is similar to the terminology used in these works and in the journal of the Association for Computing Machinery.

The art also includes "Large-Capacity Memory Techniques for Computing Systems" by M. C. Yovits pages 1 through 51. The following prior U.S. applications are directly related: Ser. No. 136,951 "Directory Insertion and Deletion Method and Means" by Luther J. Woodrum; Ser. No. 136,902, "Directory Generation Method and Means" by Luther J. Woodrum; Ser. No. 136,686; "Directory Searching Method and Means" by Luther J. Woodrum, all filed on Apr. 23, 1971 and all now abandoned. Generally pertinent art is U.S. Pat. No. 3,593,309 issued July 12, 1971 entitled "Method and Means for Generating Compressed Keys" by William A. Clark, IV, et al; U.S. Pat. No. 3,651,483 issued Mar. 21, 1972 entitled. "Method and Means for Searching a Compressed Index" by William A. Clark, IV., et al; U.S. Pat. No. 3,613,086 issued Oct. 12, 1971 entitled "Compressed Index Method and Means with Single Control Field" by Edward Loizides and John R. Lyon; U.S. Pat. No. 3,643,226 issued Feb. 15, 1972 entitled "Multilevel Compressed Index Search Method and Means" by Edward Loizides, et al; U.S. Pat. No. 3,603,937 issued Sept. 7, 1971 entitled "Multilevel Compressed Index Generation Method and Means" by Edward Loizides, et al; U.S. Pat. No. 3,602,895 issued Aug. 31, 1971 entitled "One Key Byte Per Key Indexing Method and Means" by Edward Loizides; U.S. Pat. No. 3,646,524 issued Feb. 29, 1972 entitled "High Level Index Factoring System" by William A. Clark, IV, et al; Ser. No. 99,863, "Multilevel Compressed Index Insertion and Deletion Method and Means" by Edward Loizides, et al now abandoned.

All of the above applications and patents are owned by the assignee of the subject application.

The above applications and patents apply to different inventions which are useable by a machine to operate with index operations.

UTILITY

This invention has the end-uses described for the embodiments herein to enable an electronic computer system to generate a directory of object addresses which may be represented in the system by their respective object identifiers or keys. The objects will normally be accessible by I/O devices at random locations which are identified by their object identifiers.

Another use of the invention by the computer system is to enable the machine to find and access system objects such as system control programs or application programs. For example, a directory entity may be generated by this invention using electrical or magnetic signals which represent the identifiers of such programs in the system. As a result, each key identifier made searchable with the directory represents a different computer program name, and the directory has stored within it the actual I/O or memory address to indicate where the program is currently stored. The content address may be changed whenever the object is moved to another location such as into main store, so that the directory can reflect a main stored address in preference to an I/O address where the same object may be obtained. Furthermore, if the directory size permits, both the main memory and the I/O addresses may be concurrently accommodated within the directory structure. In the latter case, the directory can be searched using the identifier of a given program to find whether or not that program is in main memory without requiring any access to I/O; this provides a "lookaside" memory operation.

Still another use for the invention is to control the allocation of buffers in the main memory of a computer, i.e. blocks or pages in a randomly accessible memory. The situation where each buffer location has a unique identifier (which may be buffer name, real memory address, or virtual memory address) is notoriously well-known in the art, i.e. IBM OS/360 and TSS/360 programming systems. By the invention generating the disclosed directory structure using such buffer identifiers as the input keys, the identifiers of the buffer locations are then represented in the directory. Furthermore, the addresses in the directory may be dynamically changed at the end of each search, i.e. the address be changed to the new address each time a buffer is assigned to a particular location in main memory. The determination of a change in the address is done by techniques not pertinent to the subject invention, such as by the dynamic address translation techniques currently being commercially used in such machines as the IBM S/360 Model 67 for the assigning of a real address to a given virtual address. After such assignment, the buffer may be accessed by searching the directory with the buffer identifier (i.e. virtual address) as a search argument to retrieve the real address of the buffer (which is the content of the sink found with the search); and the real buffer currently assigned the particular real address is thereby accessed for a reading or writing operation.

Also an important security use is obtained with the invention when it is used for accessing secure objects. The reason for the security is that the identifiers do not in fact appear within the machine's directory structure generated by the subject invention. A further security measure can be taken to prevent discernibility vertices in a memory dump of a directory. This can be done by representing its structure in a special way; comprising a machine-operation of Exclusive-ORing the content of each object address entry with the content of its predecessor entry, and storing the result into the object address entry. During any search of the directory, the object address can be easily recovered by Exclusive-ORing the content of its entry with the content of its predecessor entry found during the same machine search operation.

A particularly effective security advantage is gained, the invention's use of invertible edges with in which case it is imperative that the address of the directory source be known in order to get any meaning whatsoever out of the representations in the directory. Consequently, a high degree of security is obtained when looking at a storage dump of the directory, because the predecessor-successor relationship can not be established among the vertices represented by the rows appearing in the dump, since this can only be done by the machine which has the source address. This means that the storage dump can not reveal the real locations of object addresses in the directory. The source, or its location, can be at any predetermined location in the machine and it need not be contiguous with the directory. Thus the source can appear anywhere within or outside the directory, and it is not necessary to relocate the directory when changing the location of the source vertex. Hence, the address of the source of a directory can itself be handled on a security basis, and security can be enhanced by changing the location of the directory periodically, such as one per day or once per hour, etc.

Also complete security can be obtained without moving the location of the source of the directory by Exclusive-ORing an arbitrarily chosen security code with the source. This security code would be Exclusive-Ored with a source connector prior to a search of the directory in order to establish the connector to the source successors. Likewise this security can be periodically changed.

A special situation which often occurs with the invention is when the machine generates a directory with the same identifier representing a plurality of different objects. In such case, it is necessary to be able to distinguish among the different objects represented by the same key. This can be done by catenating a respective I/O address to the end of each repetition of the identifier; in this manner a different identifier is obtained for each object identified by the same identifier to eliminate any duplication. This eliminates the need for having any equal identifiers in the directory. Typical inverted file organizations that are well known in the art are used with this form of directory.

FEATURES AND OBJECTS

Features and objects of the invention and properties found in the invention, are:

1. A machine constructed and used binary tree directory containing a subtraction type of invertible edge that permits relocatability within the machine without having to modify the directory.

2. A directory generation method for a machine to build an electric or magnetic state directory entity from either a sorted or unsorted stream of inputted electrical identifier signals for objects to be made searchable in the directory structure.

3. A machine generation method which operates in its most efficient manner when the input identifier or key signals are sorted in either ascending or descending sequence to generate a directory entity within the machine. The generation method does not distinguish between ascending and descending sorted input sequences, and only needs to have an input signal that indicates the keys are to be inputted in sorted sequence to operate in its most efficient mode.

4. The locations of the last-inserted sink, i.e. sink electrical signal group, and its predecessor inner vertex, i.e., inner vertex electrical signal group, in the directory entity for the detection of the next insertion point for a new inner vertex and sink in a binary tree. The sink electrical signal group forms an address of an object which is retrievable through the directory entity when providing its object identifier signal.

5. A binary tree directory from sorted input keys using only backpath traces, i.e. no directory search by a search argument is required.

6. Directory generation by an insertion method in which the average number of machine bit-index test operation per insertion does not increase as the size of the directory increases during the generation process when the input is sorted.

7. A right-successor-sink insertion method which can be used to generate a directory from an ascending sorted sequence of input keys. A left-successor-sink insertion method is obtained when a descending sorted sequence of input keys is provided.

8. An insertion method which generates a directory in which each key, or other information, is inserted as a right-successor-sink entry for an ascending sorted input, or as a left-successor-sink entry for a descending sorted input.

9. A binary tree directory built directly from an input stream of sorted keys, without regard to whether the sort is ascending or descending.

10. A directory which does not contain any portion of any data to represent the data being made readily accessible through the directory.

11. A generation method in which the size of any insertion is independent of the size of any key which is to be represented in the directory.

12. Insertion into a directory in which each represented key involves essentially two entries, with a fixed amount of space being used in the directory for each key represented therein.

13. A method of building a directory from a sorted input which can be updated in the future with unsorted keys using the same insertion method.

14. A method of building a directory representing a binary tree which optimally represents only the non-redundant bit positions within the keys, or other information, represented by the sinks of the binary tree. Each vertex in the tree is related to only a single bit in a key.

15. A binary tree directory in which there is no theoretical limit on the number of sinks represented therein.

16. A binary tree director having inner vertices with the ascending path property, and having sinks sequenced in a left list order, regardless of whether the input is unsorted, ascending sorted, or descending sorted.

17. Provide a right-successor insertion method which can generate a directory using only a single pass through a set of input keys, regardless of whether the input sequencing is unsorted, ascending sorted or descending sorted.

18. A generation method which always maintains the successor pairing relationship with each insertion, wherein only a single edge representation provides both outgoing edges from a vertex. 19. Insertions into a binary tree directory while maintaining its vertices arranged so that successor pairs are located in adjacent rows in the director, i.e. left successor rows having even indices, and right successor rows having odd indices, or vice versa.

20. An insertion method in which the sink/inner vertex status information for each vertex, except the source, is represented with its predecessor vertex entry.

21. An insertion method for a directory using subtraction invertible edge representations in which each insertion requires the adjustment of no more than three existing invertible edge fields. These edge fields may be located with the successor of the new inner vertex and the two successors of that successor. If any of these three successors is a sink, or does not exist, it has no edge field to adjust. Commonly, the successors of the new inner vertex will be sinks in which case there will be no adjustment of any existing edge field.

22. A subtraction invertible edge representation which enables paths, backpaths, and semipaths to be traced with fewer operations than other types of invertible edge representations.

23. A subtraction invertible edge representation which enables the binary tree to be relocatable without any adjustment in its subtraction invertible edge representations.

24. A subtraction invertible edge which enables tracing of paths, backpaths, and semipaths with absolute addresses and without the necessity of generating relative addresses in addition to absolute addresses, as is required with exclusive-OR, addition, multiplication or division invertible edge representations.

25. An insertion method which can trace a backpath (i.e. sink-to-source direction) to find an insertion point.

26. An insertion method which can trace backpaths without dependency on the length of the path being traced.

27. An insertion method which traces backpaths without dependency on the number of vertices in the binary tree directory, regardless of how large it is made.

28. A method of generating a directory without needing to move more than one existing vertex entry per input key regardless of where the insertion is made in the represented binary tree structure.

29. A method of generating a directory containing a binary tree with search paths having near optimal average lengths.

30. A method of generating a directory containing a binary tree, which for large numbers of sinks, has paths with lengths which have approximately the statistical Normal Distribution.

31. A method of generating a directory which can be searched in a non-serial order, i.e. binary searching is used.

DRAWING DESCRIPTION

The foregoing and other objects, features and advantages of the invention will be apparent from the following more particular description of the preferred embodiments of the invention, as illustrated in the accompanying drawings.

Figure 3A:
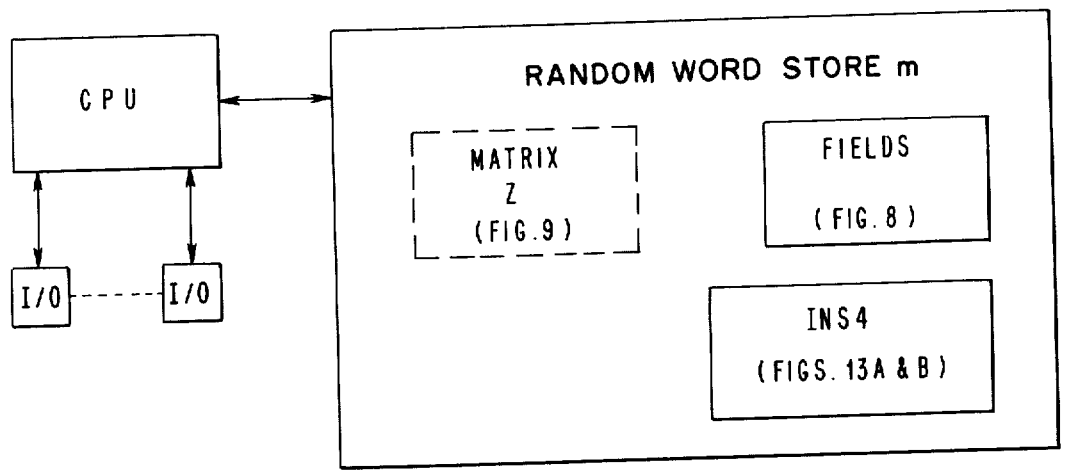

FIGS. 3A and B illustrate system environments in which the invention may be used; FIG. 3A illustrates a programmed environment for the invention embodied as a program INS4 in random word store, while 3B illustrates a hardware environment for the invention embodied as hardware INS4 in the CPU of a computer system.

FIGS. 4A and B illustrate the effect upon the binary tree of inserting the representations for a new key into the directory.

FIG. 5 illustrates the insertions made into the currently assigned pair space when an input key from an ascending sorted sequence is inserted into the directory.

Figures 6A, 6B:
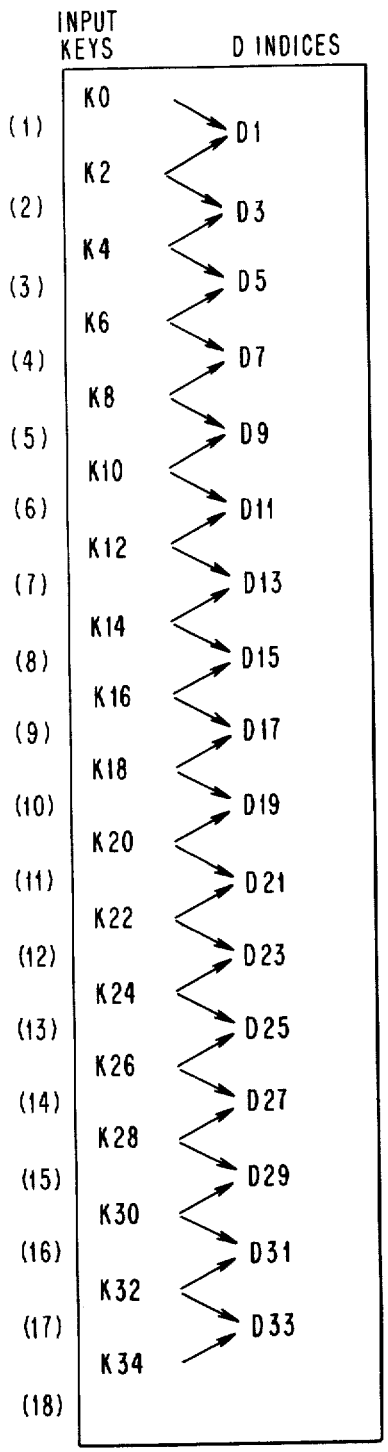

FIG. 6A represents the generation of D-indices from a sequence of sorted input keys K0 through K34 which are in ascending order; and FIG. 6B illustrates the resulting directory constructed by operation of the invention.

FIG. 7A shows an input format for a variable length key, and FIG. 7B represents a sequence of input keys.

FIG. 8 illustrates fields and/or registers which are used by embodiments of the invention.

FIG. 9 shows a matrix in which the directory construction is done by the invention embodiments.

FIGS. 10 A, B and C illustrate the key-by-key generation of a directory from a sequence of eighteen sorted keys being inputted.

FIGS. 11A and B are general overall methods using the invention, and FIG. 11C is a detailed search method SRCH4 included in FIG. 11B.

FIG. 12 is a general method embodiment (INS4) of the invention.

FIGS. 13A and B are a detailed method embodiment (INS4) of the invention.

DEFINITION TABLE

ASCENDING PATH PROPERTY: A property of values associated with vertices in a directed graph in which any sequence of values along a directed path is in increasing order. This property relates to the bit order significance in the keys, in which the highest order bit is the most significant and the lowest order bit is the least significant. See DESCENDING PATH PROPERTY.

ARRAY: A multi-dimensional space having a predetermined reference location. Any location in the array is defined by a set of indices which represent the coordinates of the location with respect to the predetermined reference location. Each index in the set defines one dimension of a location with respect to the reference location. The set of indices is represented as a subscript on the array representation.

BACKPATH: See path.

BINARY COLLATING SEQUENCE: A predetermined sequence of bytes in a set respectively representing alpha-numeric and special characters. The bits comprising each byte are considered as a binary number. The binary number values of the bytes increase when going from byte to byte through the predetermined sequence, e.g. EBCDIC and ASA character sets. Not all collating sequences are binary collating sequences, e.g. the BCD collating sequence. However, any character set can be translated to a binary collating sequence.

BINARY TREE: See TREE.

BRANCH POINT: Any vertex is a graph except a sink.

CELL: An entry in a table, or a row in a matrix.

@CELL: The address of a cell or row in a matrix.

CIRCUIT: A closed path is a graph, i.e. a path whose first vertex is also its last vertex. A DIRECTED CIRCUIT is an unidirectional closed path.

CONNECTED GRAPH: A graph in which every pair of vertices is connected by a semipath.

COMPLETE SUBTREE ORDER: A sequence, or ordering, of the vertices of a binary tree so that the vertices of the left subtree of any inner vertex appear first in the sequence (in complete subtree order), then the vertices of its right subtree appear next in the sequence (in complete subtree order), and then it (the inner vertex) appears in the sequence. In the binary tree of FIG. 0, the sequence of vertices in complete subtree order is $(d, h, i, e, b, f, g, c, a)$. A sequence of values associated with the vertices of a binary tree is in complete subtree order when the corresponding sequence of associated vertices is in complete subtree order, as, for example, in FIG. 0 the sequence of values associated with the vertices in complete subtree order is (7, 9, 6, 4, 3, 1, 8, 2, 5).

DEGREE: The total number of edges at a vertex regardless of their direction. INDEGREE is the number of incoming edges at a vertex. OUTDEGREE is the number of outgoing edges at a vertex.

DESCENDING PATH PROPERTY: A property of values associated with vertices in a directed graph in which any sequence of values along a directed path is in decreasing order. This property relates the most significant bit in a key to its lowest order bit and its least significant bit to its highest order bit. It is the converse of the ascending path property.

D-INDEX: Index to the highest-order unequal bit position obtained by comparing two adjacent keys in a sequence of sorted keys. D is the most recent generated D-INDEX while generating a directory. A LAST ACCESSED D-INDEX in a matrix need not be the LAST D-INDEX in the matrix. The index of the highest-order unequal bit position obtained by comparing any two keys in a set of keys is equal to the D-INDEX obtained by comparing exactly one particular pair of consecutive keys in the sorted sequence of the same set of keys.

DIRECTED: An adjective signifying unidirectionality.

EDGE: A connection between a pair of vertices in a graph; it is shown as a line. A DIRECTED EDGE is an edge which defines a connection in only one direction; it is indicated by an arrowed line. A DIRECTED EDGE is a connection from an INITIAL VERTEX to an END VERTEX. An INCOMING EDGE is an edge directed to a vertex; every vertex except a source has an incoming edge. An OUTGOING EDGE is an edge directed out of a vertex; every vertex except a sink has an outgoing edge.

EDGE REPRESENTATION: See section entitled "Edge Representations".

ELEMENT: One of the members of a collection, or SET; a value located in a vector by subscripting, or a value located at the intersection of a row and a column in a matrix; one of the members of a sequence.

END VERTEX: See edge.

GRAPH: A set of vertices connected by edges. A DIRECTED GRAPH is a set of vertices connected by DIRECTED EDGES. A CYCLIC GRAPH is a directed graph containing at least one directed circuit. An ACYCLIC GRAPH is a directed graph containing no directed circuit. An EDGE LABELED GRAPH is a graph in which every edge has a label. A CONNECTED GRAPH is a graph having at least one semipath from each vertex to every other vertex. An UNCONNECTED GRAPH is a graph having at least one pair of vertices not connected by any semipath.

INDEX: A position indicator along one dimension of a vector, matrix, or array. It is represented as a subscript on the vector, matrix, or array representation. An index is always relative to the first element of an array, and can be considered as a relative address.

INITIAL VERTEX: See edge.

INNER VERTEX: See VERTEX.

INVERTIBLE EDGE: See section entitled "Edge Representations".

LABEL: An integer associated with a vertex or edge in a graph.

LABEL CLASS: A collection of label sets, all being associated with the same graph.

LABEL SET: A collection of labels associated with all vertices, or all edges in a graph.

LABELED GRAPH: A graph in which the vertices are identified with a set of labels or numbers in some manner. Usually the labels are the first $v$ non-negative integers, i.e. 0, 1, 2, ..., $v-1$, where $v$ is the number of vertices in the graph.

LEFT LIST ORDER: A sequence of vertices in a binary tree, where the source of every subtree of the tree occurs immediately before every vertex in its left subtree, and every vertex in its right subtree appears next in the sequence. The vertices of a binary tree (or subtree) may be labeled (or numbered) in left list order by numbering the source first, then numbering all vertices in its left subtree (in left list order), then numbering all vertices in its right subtree (in left list order). For example, the sequence of vertices in the binary tree shown in FIG. 0 in left list order is $(a, b, d, e, h, i, c, f, g)$. A sequence of values associated with the vertices of a binary tree is said to be in LEFT LIST ORDER when the sequence of vertices corresponding to the values is in left list order.

LEFT SUBTREE: See SUBTREE.

LEFT SUBTREE ORDER: A sequence of vertices in a binary tree in which all vertices in the left subtree of an inner vertex $x$ appear in the sequence before $x$, in left subtree order, then $x$ appears in the sequence, then all vertices in the right subtree of $x$ appear in the sequence in left subtree order. For example, the vertices of the binary tree shown in FIG. 0 in LEFT SUBTREE ORDER are $(d, b, h, e, i, a, f, c,$ and $g)$.

Figure 0:
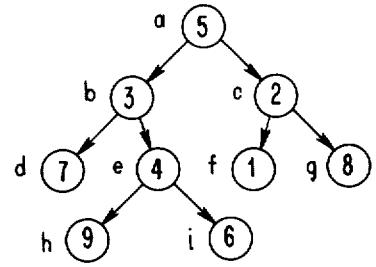
FIG. 0 illustrates a binary tree to clarify the definitions of terms in the Table of Definitions.

The sequence of values associated with the binary tree of FIG. 0 is (7, 3, 9, 4, 6, 5, 1, 2, 8).

MATRIX: A two dimensional array. A TABLE can be represented as a matrix. The location of any ENTRY in a MATRIX can be represented by two indices.

NODE: A branch point in a graph.

ORDER: An arrangement or sequence of objects in position or of events in time.

ORDERED PAIR: A predefined sequence of two members.

PAIRED VERTEX: See SUCCESSOR PAIR.

PATH: A sequence of connected edges in a graph, wherein the end point of each edge in the sequence is the initial point of the next edge in the sequence. A BACKPATH is a sequence of connected edges wherein the initial point of each edge in the sequence is the end point of the next edge. A SEMIPATH is a sequence of edges in a graph where the two edges comprising any consecutive pair in the sequence have at least one vertex in common. A PATH is a semipath, but a semipath may fail to be a path. For example, in FIG. 0 the sequence of edges ((a,b), (b,e), (e,i)) is a path, and is also a semipath, but the sequence of edges ((d,b), (b,a), (a,c)) is a semipath, but not a path. Thus, the edges in a path are always oriented in the direction of the path, whereas the directions of the edges in a semipath are not important; only the connectedness of consecutive edges is important.

PREDECESSOR: A vertex immediately preceding another vertex.

Vertex A is a predecessor of vertex B if the directed edge goes from A to B in the graph. Predecessor is the reverse of successor.

RELATED SUCCESSOR: See PAIRED VERTEX.

RIGHT SUBTREE: See SUBTREE

SCALAR: A single dimensionless quantity (as opposed to an array).

SEARCH TREE: A directed binary tree used for searching for an element of a given set, S, of elements. The vertices in a search tree are subsets of the given set, S. The two successors of a given subset of S are two non-empty sets having no element in common and whose union is their predecessor set. The sinks in a search tree are, or correspond to, one-element subsets of S. The set S corresponds to the source of the search tree.

SEQUENCE: A mapping or correspondence of the non-negative integers to the elements of a set; each non-negative integer has one of the elements of the set associated with it, and if the elements are listed in this order they form a SEQUENCE.

SEMIPATH: See PATH.

SET: A collection of elements having some feature in common or which bear a certain relation to one another.

SINK: A vertex with no outgoing edges. A TREE SINK is the last vertex in a binary tree along any path from the TREE SOURCE. A SUBTREE SINK is the last vertex in a binary subtree along any path from the SUBTREE SOURCE. For example, in FIG. 0, vertices $d$, $h$, $i$, $f$, and $g$ are sinks.

SOURCE: A vertex with no incoming edge. For example, in FIG. 0, vertex $a$ is the source of the binary tree shown in FIG. 0.

SUBGRAPH: A graph A is a subgraph of a graph B if the vertices and edges in A are subsets of the vertices and edges of B respectively.

SUBSCRIPT: A number(s) specifying an index(s), or coordinate(s), in a vector, matrix, or array. It may be multidimensional, in which case the position of each index in the subscript corresponds to a particular dimension in an array. The subscripts for the various dimensions of an array are placed in square brackets after the name of the array, and are separated by semicolons inside the square brackets.

SUBSET: A set A is a subset of a set B if all of the elements of A are also elements of B.

SUBTREE: A connected subgraph of a tree. A subtree is itself a tree. For example, in FIG. 0, the graph formed by vertices $b$, $d$, $e$, $h$, and $i$, and the edges $(b,d)$, $(b,e)$, $(e,h)$, and $(e,i)$ is a subtree of the binary tree shown in FIG. 0. LEFT SUBTREE: The LEFT SUBTREE of an inner vertex $c$ in a directed binary tree is the subtree having the left successor of $x$ as its source. The subtree of $x$ does not include $x$ as a vertex. For example, in FIG. 9 the left subtree of a vertex $a$ is the subtree composed of vertices $b$, $d$, $e$, $h$, and $i$, and edges $(b,d)$, $(b,e)$, $(e,h)$, and $(e,i)$. RIGHT SUBTREE: The RIGHT SUBTREE of an inner vertex $x$ in a directed binary tree is the subtree having the right successor of $x$ as its source. The right subtree of $x$ does not include $x$ as a vertex. For example, in FIG. 0 the right subtree of vertex $b$ is the subtree composed of vertices $e$, $h$, and $i$, and edges $(e,h)$, and $(e,i)$.

SUCCESSOR: Any vertex immediately following another vertex. Vertex B is a successor of vertex A if there is a directed edge going from A to B in the graph. For example, in FIG. 0, vertex $b$ is a successor of vertex $a$, vertex $f$ is a successor of vertex $c$, etc..

SUCCESSOR PAIR: The pair of successors to a vertex in a directed binary tree. To distinguish the two successors one is called a LEFT SUCCESSOR and the other is called a RIGHT SUCCESSOR. For example, in FIG. 0, the LEFT SUCCESSOR of vertex $b$ is vertex $d$, and the RIGHT SUCCESSOR of vertex $b$ is vertex $e$. A PAIRED VERTEX of a vertex $x$ is the other vertex in the successor pair containing $x$. A vertex $x$ and its paired vertex comprise a successor pair. For example, in FIG. 0, the paired vertex of vertex $b$ is $c$, and the vertex paired with $c$ is $b$.

TREE: A connected, undirected graph without circuits. A tree is a graph with exactly one path connecting any two vertices in the graph. A DIRECTED TREE is a directed graph whose corresponding undirected graph has no circuits. A DIRECTED BINARY TREE is a directed tree with every vertex having an OUTDEGREE of either zero or two, and having a single, unique, source. BINARY TREE always means a directed binary tree unless stated otherwise. A binary tree is always considered directed, although the directions on the edges are usually omitted in figures, since the direction is always away from the source of the binary tree. A binary tree is shown in FIG. 0.

UNDIRECTED: An adjective to signify bidirectionality.

UNDIRECTED GRAPH: A graph in which every edge is bidirectional.

A graph formed from a directed graph by making all edges bidirectional is called the UNDIRECTED GRAPH corresponding to the DIRECTED GRAPH.

UNDIRECTED TREE: An undirected graph with no circuit.

VECTOR: A one dimensional array.

VERTEX: A node, or point, in a graph or tree. An INNER VERTEX in a directed graph is a vertex with at least one outgoing edge; any vertex except a sink. For example, in FIG. 0, the inner vertices are a, b, c, and e. An inner vertex in an undirected graph is any vertex having a degree of at least two.

VERTEX LABELED GRAPH: A graph in which every vertex has a label.

VERTICES: Plural of vertex.

In order to enable the reader to better understand the search invention described and claimed in this specification, an understanding of the structure of the directory is essential. This is best gained by understanding how the directory is generated. Therefore the next several sections are provided about the directory generation and structure as preliminary to describing the subject invention.

GENERAL BINARY TREE RELATIONSHIPS

The subject invention provides and maintains a directory generated by mapping a sequence of input keys, and indices derived therefrom, into a binary tree, such as shown at the bottom of FIG. 10C. In the binary tree, the keys are represented as sinks K0 through K34, each having an even number, and the inner vertices are derived therefrom and are represented by D-labels, D1 through D33, each having an odd number. The D-labels represent the sequence in which D-indices are generated. A D-index is associated with each D-label.

The directory generation process is based on a mapping of D-indices and keys into the binary tree. For sorted keys, the mapping operation uses the value relationship among generated D-indices to map them into a descending sequence along each backpath in the binary tree from each last inserted sink.

The value of each D-index is derived from a bit by bit comparison between two adjacent keys in the input sequence. The D-index is the index of the highest-order unequal bit in this comparison. The keys being compared should not be equal.

Along any path in the tree, the values of the D-indices are in ascending sequence from the source of the tree to a sink. (D-indices should not be confused with the D-labels i.e. D25, D27, etc.. The D-labels are shown in descending, varying or ascending sequences along different paths in FIG. 10C. This sequencing difference between D-labels and D-indices along any path is due to the different functions that they provide: The "D-labels" represent the order in which the "D-indices" are derived from the input stream of keys. The D-index values control the locations of the inner vertices in a path in the binary tree.)

The "D Labels" and "K Labels" constitute a labeling of the vertices of a binary tree in left subtree order, i.e. a labeling of the vertices so that for any inner vertex, the labels of vertices in its left subtree are all smaller than its label, and the labels of all the vertices in its right subtree are greater than its label. The mapping of D-indices into a binary tree as disclosed in this specification maintain the ascending path property for the vertices which are labeled in left subtree order.

An example of a path is from source D25 to sink K4, the encountered D-indices are D25, D17, D9, D5, and D3, in which the value of D25 is less than D17, which is less than D9, which is less than D5, which is less than D3. The ascending path relationship among the D-index values in each path in the directed tree in FIG. 10C can be expressed by the following inequalities:

$$D1 < D3 < D5 < D9 < D17 < D25.$$
$$D7 < D5 < D9 < D17 < D25.$$
$$D15 < D13 < D11 < D9 < D17 < D25.$$
$$D19 < D21 < D17 < D25.$$
$$D23 < D21 < D17 < D25.$$
$$D31 < D29 < D33 < D27 < D25.$$

By knowing that the values of the indices must have this nondecreasing relationship from the source, which is called the "ascending path property", the invention can generate a directory from a set of sorted or unsorted input keys that will completely represent a binary tree which will be unique for a given set of input keys.

This generation method builds a directory of vertices in machine-readable binary form by generating the D-index for each input key to be represented in the directory, and associating that D-index with a vertex which is to be represented in an entry in the directory. Each inserted inner vertex has a D-index which is distinct from any D-index existing along the same path in the binary tree. The vertex entry is locatable anywhere in the directory, which includes the D-index and an edge field which locates its pair of successors in the binary tree. The physical location of any vertex entry in the directory is independent of its relationship to its predecessor or successors in the binary tree.

GENERAL DESCRIPTION OF DIRECTORY

As shown in FIG. 6B, the initial pair of rows in the directory is reserved for initial parameters and a source vertex of the binary tree in the directory. FIG. 9 shows the directory being generated in a matrix Z. The parameters in the initial row are provided for future use in searching or in making insertions or deletions in the directory. Also any search, or insert, or delete request can access the directory via its source vertex in the predetermined location. The first row contains two parameter entries, which are the total number (N) of keys (sinks) in the directory, and the next assignable space address in matrix Z. The size of matrix Z is allocated in advance to reserve the memory space needed to hold the directory before it is generated or while insertions are being made. This space allocation function is simplified by having fixed length entries for the respective items to be inserted into output matrix Z. It is found in practice that having fixed length rows of 32 bits in matrix Z does not restrict the directory in any practical sense because it permits handling a data set having a number of keys of up to 2 to the 32nd power, (the number of distinct addresses available from 32 bits) i.e. 4,294,967,296 keys, which is an extraordinarily large file when it is understood that each key can represent a different data record in a data base. For reasons which will become apparent later, a field within the row may store a D-index, and if this field is only 11 bits, it can accommodate a D-index generated from keys having a bit length of up to 2048 bits, which corresponds to a length of up to 256 bytes of eight bits each.

This key length is considered more than adequate in practicing the invention. However, key lengths greater than 256 bytes can be accommodated by the 11 bit field when their D-indices do not exceed the 11 bit field.

As a result, any directory with one header row will have precisely two words (i.e. totaling 64 bits) for each input key, regardless of the number of input keys provided, and regardless of the actual lengths of the respective keys. The total number of rows in the directory is 2N.

SYSTEM CONFIGURATION

Figure 3B:
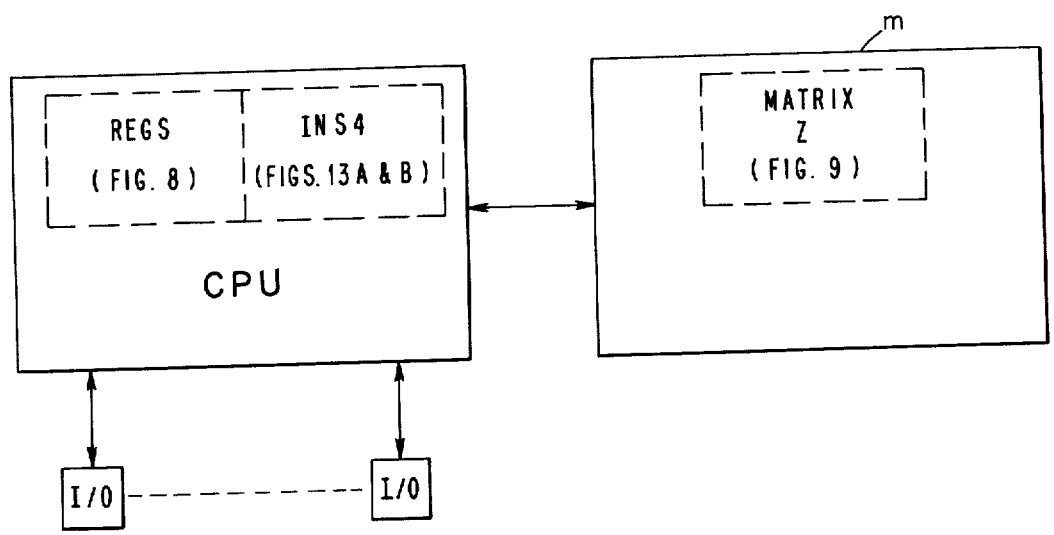

FIGS. 3A and 3B each show a system configuration in which the invention is adapted to a general purpose digital computer. FIG. 3A illustrates the invention embodied as INS4 software loaded into the random word store (main memory or writeable control store) of a general purpose computer. FIG. 3B illustrates the invention embodied within the CPU hardware as the INS4 hardware component. Anyone currently skilled in the art of programming one or more types of digital computers currently available on the commercial market will be able to program the subject invention directly from the method descriptions given in this specification, and this has been done. Any computer engineering development group with experience in designing hardware for computer central processing units (CPU's) will be able to reduce to a hardware level, with the use of ordinary skill in the art, any of the methods described in this specification.

The matrix fields and registers shown in FIG. 8 are physically operated areas in the computer system which are in the main memory of the system in FIG. 3A and in the CPU in the system of FIG. 3B.

MATRIX FORM AND TERMINOLOGY

The notation used herein with respect to the entries in matrix Z in FIG. 9 which receives the directory is that commonly found with programming languages such as APL\360 or ALGOL, in which any entry in a matrix can be identified by a subscript notation in brackets to the right of the symbol identifying the matrix. The subscript locates a field within its matrix by specifying the coordinates of that field. Each dimension within the subscript is separated by a semicolon. In the case of the two-dimensional matrices used herein, the number to the left of the semicolon within the brackets identifies the row coordinate in the matrix, while the number to the right of the semicolon within the brackets identifies the column in the matrix being referenced. This notation is used in a book by K. E. Iverson entitled "A Programming Language" published in 1962 by Wiley. Hence any field within the matrix can be specified by this notation, for example Z[R;d] in which R is the row index and d is the column index. Zero-origin indexing is used for the dimension notation, i.e., the first row at the top of the matrix is zero and the first column on the left in the matrix is zero.

Thus in FIG. 9 any entry or part thereof, can be specifically represented with subscript notations, in which the left-most field D in row one is Z[1;0] and the right-most field EDGE in the same row is Z[1;5]. Thus it is seen in the last example that the left-most one in the bracket represents the row 1, and the right-most number within the bracket represents column 5 to define a specific field Z[1;5] in that row.

Also any entire row or entire column may be referenced by not putting any representation for the non-specified dimension. For example Z[3;] refers to the entire row 3 of matrix Z as a single field; and Z[1;] refers to the entire column 1 of matrix Z as a field. A row in matrix Z contains a cell of the directory. The same rows may be represented in matrix $m$ which represents the overall memory which contains matrix Z. Then for example Z[1;0] converts to $m$[DAR+1;0].

Figure 2:
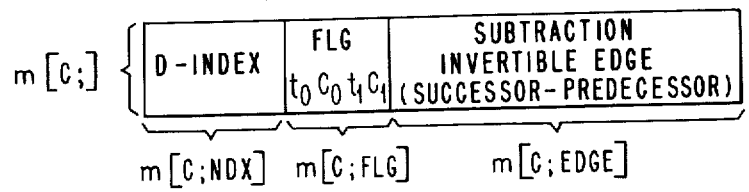
FIG. 2 illustrates the format of an inner vertex entry in a direction constructed by the invention, and associates definitive descriptors used herein to identify a particular entry and its different parts.

FIG. 2 illustrates a specific example of the notation used for any row entry in matrix $m$; in which $m$[C;] represents the entire row C, while its parts are represented is $m$[C;NDX] for the D-index field, $m$[C;FLG] for the flag field, and $m$[C;EDGE] for the subtraction invertible edge field.

Matrix Z is illustrated in FIG. 9 with six columns and 2N number of rows. The number of rows in matrix Z is determined by the number of input keys which are to be represented in the directory to be constructed within matrix Z. Given N number of input keys, there will be precisely 2N-1 number of entries in matrix Z to hold the directory for N number of keys, plus the number of header rows of which one is shown in FIG. 9.

Also in this specification any entry within a matrix may be represented in a second way in addition to the programming language notation just described. The other is specified by a symbol tailored to represent the entries in a particular column. For example, in FIG. 9, the symbols $t_0$, $c_0$, $t_1$, $c_1$, are used to represent respective 1-bit fields in each row at the same respective column positions, which may be represented as $m$[;1,2,3,4]. FIG. 9 also illustrates the use of the same specialized column symbols, and also has additional column symbols D and EDGE, which may also be represented as $m$[;0] and $m$[;5] respectively. FIG. 2 also illustrates this notation. The programming language notation more precisely identifies fields in a matrix since row identification is provided, which is essential in a machine addressing sense, since all of these matrices are intended to describe machine-controlled functions in the main memory of a computer system, such as an IBM S/360 or S/370 data processing system.

SUBTRACTION INVERTIBLE EDGE REPRESENTATIONS

Figure 1:
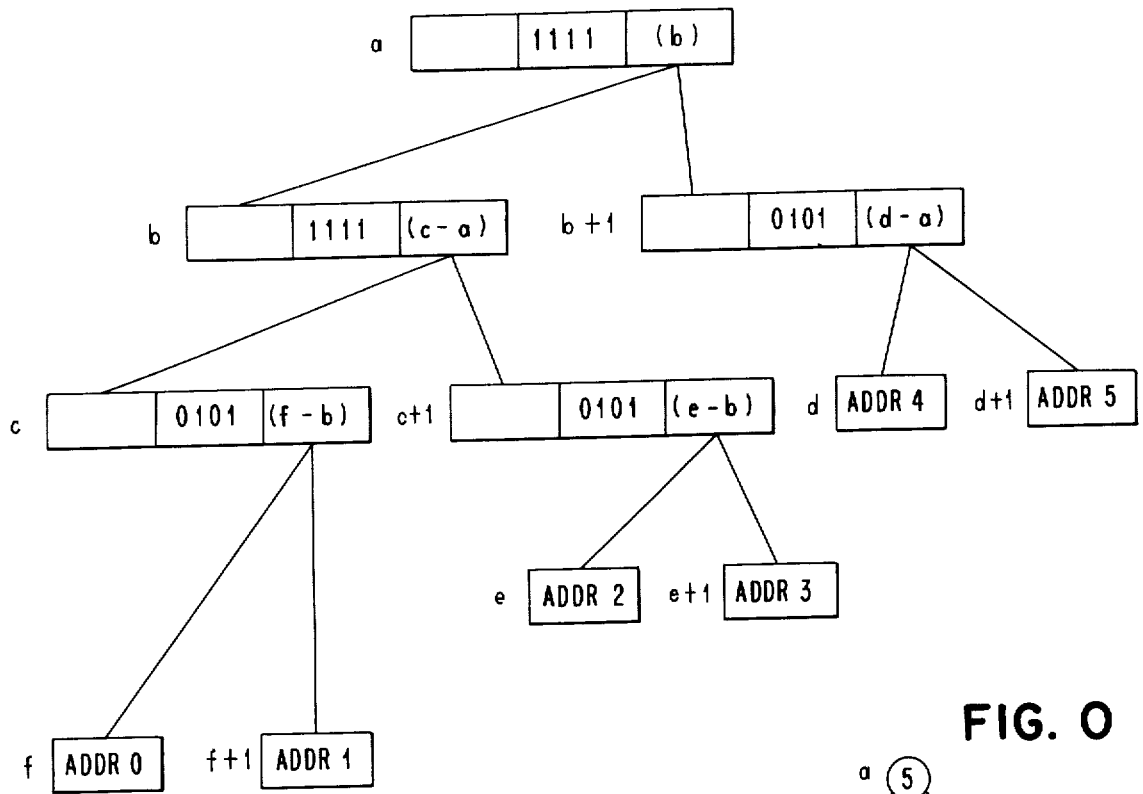
FIG. 1 illustrates subtraction invertible edge representations in a binary tree.

FIG. 1 provides an example of a binary tree having subtraction invertible edges. FIG. 2 illustrates the format of the inner vertex representation which is provided with a subtraction invertible edge. This inner vertex representation is also used in matrix Z in FIG. 9 and in the overall memory represented by matrix $m$. FIG. 2 shows the names of the fields in each inner vertex in FIG. 1 with the rightmost field containing the EDGE which represents the two outgoing edges of the vertex. In FIG. 1 the vertices are shown with their outgoing edges connecting them into a binary tree arrangement, as is found with the vertex entries in the generated directory in matrix $m$. The address for each vertex in FIG. 1 is shown at its left side, i.e. address $a$ is for the source, addresses $b$ and $b+1$ are for its successors, addresses $c$ and $c+1$ are for the successors of the vertex at address $b$, etc. The sink vertices have an address within their content, which may be the address of a key.

In the invertible edge connected tree shown in FIG. 1, the source's edge $b$ nevertheless contains the address of its successor pair. However all other inner vertices in the tree have a subtraction invertible edge. For example, the vertex at address $b$ has an edge value derived as illustrated therein, i.e., derived from $c-a$ for which $a$ is the address of its predecessor and $c$ is the address of its successor. Likewise the vertex at address $c+1$ has its edge value derived from $e-b$, for which $b$ is the address of its predecessor and $e$ is the address of the left successor in its successor pair (which is a sink).

The subtraction invertible edge connected tree in FIG. 1, for example, can be searched in either direction if the addresses of any two sequential starting vertices in the path are known, and without any conversion of the included subtraction invertible edges when the directory is relocated. In FIG. 1, any path from the source can be traced, since the address of the source is known, i.e., address $a$, and the next address $b$ or $b+1$ for the next vertex in any path is known from the edge field in the source entry which contains $b-a$. The address of $c$ can be determined from the invertible edge with the vertex at address $b$, i.e. $c=a+(c-a)$. (The address of the next vertex also can be derived, i.e., $e=b+(e-b)$, etc. In this manner, any path in the tree may be traced from source to sink by deriving the address for each next vertex in the path to locate it, and then to obtain its invertible edge for deriving the next vertex address, etc.

Any path can be traced in the backpath direction (i.e., from sink to source) using the same method, when the address of any sink and its predecessor are known. For example, if addresses $e$ and $c+1$ are known, addresses $b$ and $a$ can be derived.

In backpath tracing, only left successor addresses are used. The left successor address can easily be found when the right successor address is known, since the left successor is in the adjacent directory row for the same successor pair. Thus if right successor address $c+1$ is known, the left successor address must be $c$, i.e. by subtracting 1 from $c$. The backpath trace knowing address $e$ and address $c+1$ then is: $b=e-(e-b)$, and $a=c-(c-a)$.

Accordingly, if the path is first traced from the source to any sink (during which the addresses derived for the sink and its predecessor are stored), the same path can be retraced in the backward direction; this type of backpath trace is used in the disclosed embodiment.

The subtraction invertible edge is generated by the machine either (a) subtracting the row index of the predecessor vertex from the row index of the left successor vertex, or (b) subtracting the left successor index from the predecessor index. The (a) and (b) representations have opposite signs but the same magnitude.

The machine operations for generating a subtraction invertible edge can be expressed as one of the following:

(1) S(Index) − P(Index)
(2) S(Abs) − P(Abs)
(3) P(Index) − S(Index)
(4) P(Abs) − S(Abs)

LEGEND:
P(Abs) is the absolute address of the predecessor vertex, i.e. address in memory $m$.
S(Abs) is the absolute address of the succesor vertex, i.e. address in memory $m$.
P(Index) is the index in the directory of the predecessor vertex, i.e. relative location in directory Z.
S(Index) is the index in the directory of the successor vertex, i.e. relative locaton in directory Z.

The resulting edge values of (1) and (2) are identical to each other; and the resulting edge values of (3) and (4) are identical to each other. The sign of (1) and (2) is opposite to the sign of (3) and (4), although they all have the same absolute value. A discovery regarding the subtraction invertible edge is a simplification that it enables in the relocation utilization of a directory using this preferred edge representation. This relocation simplification enables the directory to be arbitrarily relocated in the main memory of a computer system (i.e. paging system) without regard to the directory's base address; this avoids the standard requirement of adding a base register value to obtain the relocated absolute address. Hence, the absolute main storage address of a directory vertex is obtainable without the extra step of a base address addition. A unique feature is that the one base address is inserted during an initialization act, it is no longer handled as a separate step during the remainder of the iterative operations.

The proof of the machine relocatability without the use of a base address is:

(1a) P(Abs) + [S(Index) − P(Index)] = S(Abs)
(2a) P(Abs) + [S(Abs) − P(Abs)] = S(Abs)
(3a) S(Abs) − [S(Index) − P(Index)] = P(Abs)
(4a) S(Abs) − [S(Abs) − P(Abs)] = P(Abs)

The sign of the operation indicates whether tracing is forward or backward along a path.

The subtraction invertible edge in 1(a) through 4(a) is generated by subtracting the predecessor address from the successor address. This is preferred over generating the edge field by subtracting the successor address from the predecessor address because more machine operations are expected to use forward tracing (i.e. predecessor to successor direction) than backpath tracing (i.e. successor to predecessor direction); machine addition is a faster electronic operation than machine subtraction which requires an additional complementary step in the hardware.

The relocation advantage of the subtraction invertible edge is not found with other types of invertible edge representations, such as the Exclusive-OR (i.e. S ⊻ P), addition (i.e. S + P), multiplicaton (i.e. S × P), or division (i.e. S/P or P/S) invertible edge, each requiring the further step of adding a base register value to an index determined edge value in order to obtain the relocated absolute address essential to internal machine operation during the iteration of the method.

The fundamental reason is that only the subtraction invertible edge can be generated with a different address reference than is used in the later determination of its successor or predecessor location, with only a single operation to do this. This is because only the subtraction edge is the same whether generated from indices relative to the directory origin or from absolute addresses relative to the beginning of the hardware main storage unit. This mixture of index and absolute location references is seen in expressions (1a), (2a), (3a) and (4a). For example, expressions (1a) and (3a) become meaningless when attempted with another type of invertible edge. For example, with addition invertible edges:

(5a) P(Abs) − [S(Index) + P(Index)] ≠ −S(Abs)
But (6a) P(Index) − [S(Index) + P(Index)] + Base address = −S(Abs)

Similarly with the Exclusive-OR invertible edge:
(9b) P(Abs) ⊻ [S(Index) ⊻ P(Index)] ≠ S(Abs)
But (10b) P(Index) ⊻ [S(Index) ⊻ P(Index)] + Base address = S(Abs)

Similar examples can be written for the multiplication or division invertible edges.

In expressions (1a), (2a), (3a) and (4a), the length of the subtraction edge representation is not dependent on the physical size of the storage unit and is desirable.

Another discovery about the subtraction invertible edge is that it can be used without change with both absolute and relative addressing. All other known invertible edges (i.e. Exclusive-OR, addition, multiplication, division, etc.) have different forms (requiring separate generation operations) for absolute or relative addressing operations.

That is, in addition to the absolute addressing previously explained, the subtraction invertible edge can be used, without being modified to generate the relative address of either a predecessor or successor of the vertex having this edge representation. For example if a relative address within a local storage block is being used as a reference address in the operation, a relative address results for the other vertex. For example:

P(Relative) + Sub. Inv. Edge = S(Relative)

S(Relative) − Sub. Inv. Edge = P(Relative)

The units of each term in the expression, whether absolute or relative, must be the same, i.e. all terms may be in bytes or all may be in words, etc. Thus the units in which the subtraction invertible edge is generated must always be known. However the units of the subtraction invertible edge is easily translated by the usual translation factors found in computer memory addressing. For example, a subtraction invertible edge may be translated from bytes to words by division by four for addressing in an IBM S/360 computer. For example:

$$P_{(Index)}^{(Word)} + \frac{\text{Sub. Inv. Edge (byte)}}{4} = S_{(Index)}^{(Word)}$$

or $$S_{(Index)}^{(Word)} - \frac{\text{Sub. Inv. Edge (byte)}}{4} = P_{(Index)}^{(Word)}$$

CONTENT OF A SINK ROW

The content within a sink row can associate the sink with any required information; for example, the sink content may be an address of a record being represented by the sink. The record may be stored in main memory or on an I/O device. Thus the sink content may encompass a range of types of addresses in some directories.

In this sense, the sink in the binary tree is represented by the index of the row, and the content of the row can translate the meaning of the sink into anything that the directory user requires the sink to represent.

BASIC DIRECTORY GENERATION BY INSERTION METHOD

The invention can be used to generate a directory completely, or it can be used to continue the generation of a directory party constructed by the generation method disclosed and claimed in either of the specifications having Ser. No. 136,902 or 136,951.

Directory generation may be started by the subject invention when initially the directory is without any entries, i.e. an empty directory exists in a buffer allocated for the directory.

There are two stages in the generation process when generation begins with an empty directory. The first stage is the "embryo" stage, and the second stage is the "general growth" stage. The embryo stage is very simple, and it is completed when two sink entries and one inner vertex are placed in the directory.

The second stage is the general growth stage in which the directory is made to grow beyond the embryo stage. There is no theoretical limit to the size of the growth in the second stage. In practice the size will be limited by the number of inputs and the size of the computer storage.

When the first input key is provided during operation (1) in FIG. 6A, its representation (i.e. its address represented by the symbol @K0) is directly inserted as a sink in source row 1, which becomes the only entry in the directory. When a second sink (i.e. representing the address @K2 of the second key) is provided during operation (2), the first inner vertex D1 is generated; and it is inserted into the directory source row 1 and the displaced content of row 1 is moved into the left successor row 2 of the newly assigned successor pair rows 2 and 3. Then the new sink K2 is inserted into right successor row 3. As a result, three entries now exist in the embryo directory.

With the second and each subsequent new sink to be inserted, a corresponding new inner vertex is generated. Each new sink is inserted as the right successor of the corresponding new inner vertex, i.e. the new inner vertex is the predecessor of the new sink. The new inner vertex displaces a previously existing vertex, which becomes the left successor of the new inner vertex.

The successor-pair location concept is used herein, so that the addition of each new sink and its new predecessor results in a new pair of vertices being provided in the directory, which is accommodated by a newly assigned successor pair. The sink in the newly provided pair of vertices is always located as a right successor in the new successor pair space. The new inner vertex displaces an existing vertex, which is always moved into the left successor location in the new successor-pair space. The new inner vertex representation in the directory includes an edge representation to locate the new successor pair in the directory. The displaced vertex may be either an inner vertex or a sink.

In the preferred construction of the directory, each right-successor always has a directory index which is one index unit higher than its related right successor. Because of the paired successor rows, if the first left successor location in the directory has an even valued directory index, all of the left successors in the directory will have an even valued directory index and all of the right successors will have an odd valued directory index.

The insertion method uses the "ascending path" property among all of the inner vertices along each directed path in the binary tree, and uses the "left list order" property among the sinks in the directory.

The "left list order" property means that the sinks in the directory represent keys having an ascending order when going from sink to sink in a counterclockwise direction about the source.

The "ascending path" property means that while going along any path in the direction from the source to any sink the D-indices of the inner vertices have an ascending sequence along the path.

In FIG. 10A, B and C operations (1) – (18) are performed to generate the directory illustrated in FIG. 4B representing the binary tree in FIG. 2A. Each of operations (1) – (18) represents the insertion of another sink into the directory; this is shown both graphically and with a directory for operations (1) – (5). The number to the right of each vertex in the graph shown in any operation (1) – (5) represents the row location in the adjacent directory containing the vertex representation. The odd number with D to the left of each vertex indicates the temporal sequence in which the inner vertices are added to the directory. The even number with K below each sink indicates the temporal sequence in which the sinks are added to the directory.

Operation (1) only involves inserting the first sink in the directory. It is inserted into row 1 of an allocated buffer area that may be called matrix Z.

Operation (2) is the first operation which can be said to generate a binary tree since it is the first operation in which an inner vertex is generated. A new sink@K2 is inserted, and the new inner vertex entry D1 is generated by comparing the two sink keys K0 and K2, which have their address representations made the successors of the new inner vertex entry D1. Sink@K2 is made the right successor because the ascending sorted input sequence specifies K2 is greater than K0. The inner vertex D1 is the current source, and it is put in row 1.

The new inner vertex D1 includes the generation of a new D-index from this comparison in a manner similar to the previously described generation of a new D-index from a pair of keys, i.e., their correspondingly-positioned bits are compared bit-by-bit from their high-order end until the first bit position is found having unequal bits in the two keys. The index of this highest-order unequal bit position, expressed as a binary number, is the D-index.

Operations (1) and (2) illustrate simple but special case situations which occur when a directory is being generated, in which it initially contains no entry, then contains one sink, and then two sinks. After two or more sinks exist in the directory, a general situation exists for which the generation method can operate without regard to the current size of the directory.

In operation (3) a new sink@K4 is provided to represent a next key K4, i.e. the address of a record having the K4 as its key. The next key is used while backpath tracing through the binary tree from the last inserted sink@K2 illustrated for operation (2) having the three vertices. The backpath is traced in the manner previously described for invertible edge directories which is claimed in prior specification, Ser. No. 136,951. The trace follows the particular backpath up the binary tree and ends at the first inner vertex entry containing a D-index which is less than the new D-index generated in the comparison between the next key and the last key, i.e. K4 and K2 respectively.

The backpath trace compares the bit index (i.e. D-index) associated with each inner vertex encountered along the path in such manner that only a small number of compares ordinarily need to be performed in locating the insertion place. In practice with a directory accommodating a medium to large size data base, most insertion places will occur at the last sink or at its predecessor. The sink's predecessor is the first vertex encountered during a backpath trace. As a result, the backpath trace makes the number of traced vertices (and the trace time) very small and independent of the path length and the size of the directory. The invertible edge representation may require adjustment in the edges of the successors of the vertex which is moved during the insertion operation.

During the backpath trace, the new D-index value is compared with the D-index value found with each inner vertex encountered along the path. This comparison finds where the new D-index can be put into the traversed backpath in order to maintain the ascending sequence of D-indices along the path, i.e. ascending path property. This backpath traverse ends at the first vertex in the backpath having a D-index less than the new D-index. That vertex is in row P in the directory, and C is its successor. The new inner vertex then displaces the entry in row C to maintain the ascending sequence of D-indices in the path, the new inner vertex displaces the sink in the path. If the new D-index is less than all D-indices in the path, the new D-index entry replaces the source entry. Thus in the resulting graph of operation (2), the new D-index D3 generated for the next key K4 is found to be less than the only D-index, D1, in the path. Since the new D-index is less than every inner vertex in the backpath being traced, (there is only one here), the new vertex entry D3 is placed by operation (3) into source row 1 which was previously occupied by vertex entry D1, which is made a left successor of new vertex entry D3. The new sink@K4 is made the right successor of new vertex entry D3.

A pair of adjacent rows is allocated in the directory (shown as dashed boxes in FIG. 10A) to accommodate the two new entries in the directory resulting from each new sink to be represented. The successors of the new inner vertex are put in this allocated pair of rows. The left successor is always put in the even row, and the right successor is always put into the odd row of the pair in FIG. 10A. The new sink is always put into the odd row of the newly allocated rows.

Accordingly in operation (3), the new sink@K4 is put in the right successor row 5; and the old vertex entry D1 (whose row 1 is to receive the new vertex D3) is moved into the left successor row 4 of the new vertex entry D3. In this manner the new vertex D3 displaces the location of existing vertex D1 in the traced path. Operation (3) is then complete.

Operation (4) is performed similarly for a new sink K6 to be inserted. The next key K6 is compared to the prior key K4 to generate the new D-index D5 for a new vertex to be inserted. The new D-index D5 is used to trace the binary tree backpath from the last sink,@K4, illustrated for operation (3). The trace traverses the backpath having the inner vertex entries D1 and D3, and therefore terminates at source D3.

During the trace, the D-index D3 is found to be greater than the new D-index D5. Therefore the source vertex entry D3 is displaced by the new vertex entry D5; and vertex entry D3 is moved to the left successor location of new vertex entry D5.

A pair of rows 6 and 7 is allocated in the directory to accommodate the two new entries in the directory; and displaced vertex D3 is moved into row 6 (i.e. left successor); and the new sink@K6 is to be moved into row 7 (i.e. right successor).

Each insertion of a new inner vertex also involves generating an edge field which can enable the accessing of its successor pair. Thus an edge field is generated for each new inner vertex entry (D1, D3, D5, etc.) to locate the pair of rows containing its successor vertices; how this is done is discussed elsewhere herein.

The subtree having a displaced vertex as its source is not changed in the directory, except that an invertible edge adjustment is needed within each inner vertex entry which is a successor of a displaced inner vertex. Thus in the graph for operation (4), rows 2, 3, 4, 5 and 6 (comprising the subtree from displaced vertex D3) are not changed except that an adjustment is needed to the invertible edge field in row 4, i.e. it is the only inner vertex successor of displaced vertex D3, and an adjustment of the edge field for D1 is needed. If absolute index edge representations are used, no change is needed to any edge field, since the absolute edge in the moved vertex still indexes the same successor pair location. However, a change is required in the edge representation if either the offset or invertible edge representation is used, because each of these edge representations is generated from the location of both the moved vertex and its successor, and must be changed if either index is changed. Operation (4) is complete.

Operation (5) continues the directory generation by insertion of a new sink representing next key K8. Like in the previous operations, a new D-index for a new inner vertex D7 is generated by comparing the next key K8 with the last key K6. The new D-index is then used during the trace of the backpath from the last sink@K6. In operation (5), the trace finds the D-index D5 in the existing source vertex entry to be smaller than the new D-index, and the trace ends there. Hence the sink vertex entry@K6 in row 7 of the graph in operation (4) is to be displaced by the new inner vertex D7; and the prior sink @K6 is to be moved to row 9 allocated to accommodate the left successor of the new vertex entry D7. The new sink@K8 is a right successor, and it is put in the row 8. Since both successors of the newly inserted inner vertex D7 are sinks, no edge adjustments are involved. Operation (5) is now complete.

It can be observed that three different types of cases occur. They represent general cases that can occur regardless of the size of the binary tree (or corresponding directory) into which an insertion is to be made. They are:

1. Where the insertion displaces a sink.
2. Where the insertion displaces an inner vertex, other than the source.
3. Where the insertion displaces the source.

From the preceding description of simple examples of the insertion method, a general understanding should be obtained of the particular method being used. It is this method and its reduction to a state which is readily useable by industry which provides the invention in the subject application.

The basic generation method may be briefly stated for a sorted input as follows:

BASIC GENERATION METHOD SUMMARY FOR SORTED KEYS

1. Compare the current key with the last processed key in the sorted sequence to generate a new D-index, which is the index of the highest-order unequal bit position in the comparands.

2. Trace a backpath from the last inserted sink (which represents the last processed key) toward the source in the existing tree, and compare the new D-index to the D-index of each vertex encountered along the path until the location of a vertex C is found which is to be displaced by a new inner vertex to be inserted. Vertex C is either (1) the sink entry, if the directory has only one entry, or (2) if more than one entry exists, the successor of the first inner vertex found on the backpath with a D-index less than the new D-index, or (3) the source if the new D-index is less than every D-index in the backpath.

3. Insert in the right successor location of an assigned successor pair space a representation (i.e. address) of the current key.

4. Transfer the content of vertex C to the left successor location in the assigned successor space. (If vertex C represents an inner vertex, its edge representation needs to be adjusted if the offset or invertible form of edge representation is used in the directory; no edge representation change is made if the absolute edge representation is used in the directory. If C is a sink, no edge is involved.)

5. Generate a new inner vertex and store it at the location C by inserting therein: the new D-index, an edge field to the location of the assigned successor pair space, the right successor (i.e. $t_1 c_1$) flag bits indicating that the right successor is a sink, and the left successor flag bits (i.e. $t_0 c_9$) indicating whether the displaced vertex is an inner vertex or a sink, as represented by the tc field in the predecessor vertex for the prior vertex C entry.

6. Adjust the flag field in the predecessor of vertex C to represent an inner vertex, since the predecessor previously may have vertex C represented as a sink.

7. Adjust the invertible edge representation in any inner vertex successor of the moved vertex C to reflect changed location of the successor's predecessor.

GENERAL-GENERATION METHOD

FIGS. 11A and 11B show two modes in which the invention may operate. FIG. 11B is the more general in the sense that it will operate with any kind of input sequence of keys, whether sorted, partially sorted, or totally unsorted; any system which will operate with unsorted keys comprehends the partially sorted and sorted situations.

Basically step 1005, FIG. 11B, is broad enough to comprehend the INS2 embodiment in FIGS. 11A through 11H in prior application Ser. No. 136,951 (previously cited), as long as an exclusion is made of the implementations in the referenced FIGS. 13A and 13B, which are superior implementations for an IBM S/360 computer system than those described in the earlier filed application Ser. No. 136,951.

However FIG. 11A broadly comprehends an inventive improvement found in the subject application for input sequences of keys which are sorted. The fundamental difference between FIGS. 11A and 11B is in the ability of FIG. 11A to eliminate the path search method 1004 found in FIG. 11B.

In more detail, in FIG. 11B, the process is started with initialization and space allocation step 1001 being entered, wherein storage space is provided for the directory to be constructed, registers and fields are allocated and reset as necessary, initialization parameters are provided for the allocated storage space, registers and fields, the location of the beginning of the key sequence, and other housekeeping preliminaries such as those usually required prior to the execution of a computer program.

Then step 1002 is entered to test if the stream of input keys has anymore keys to be processed. Initially it will be expected that the YES exit will be taken. Whenever step 1002 determines that there are no more keys to be processed, the NO exit is taken to end the processing.

Step 1003 then reads the next key in the input sequence which becomes the current key being processed for providing a representation insertion into the directory. The address of the data record represented by the key is also read from the input sequence by step 1003.

Method 1004 is entered to execute a path search using the current key as a search argument. This path search will trace a forward path from the source to a sink in the currently existing directory; that is, the search begins at the source of the directory and traces a path to a sink which represents a key. The search path, which is determined by the bit configuration of the current key, is the same path which is determined by the key represented by the sink at the end of the path and the current entries along that path. That is, the path vector bits in the current key are identical to the corresponding path vector bits in the key represented by the sink at the end of the path. If these two keys are not equal, one key is greater than the other; and they differ from each other in a unique highest-order bit position, identified by the new D-index. The D-index is not one of the D-indices in the inner vertices encountered along the path.

During a backpath trace from the sink found at the end of the path, the new D-index will be inserted at vertex C along the path to maintain the ascending path property of D-indices. The current key is either greater or less than all keys represented by sinks in the subtree whose subtree-source is vertex C. If the keys are sorted, the current key will always be either greater than (ascending), or less than (descending), the keys in this subtree.

In the general case of unsorted input keys, the sink found by the path search need not be the last inserted sink, since it will be the last inserted sink only if the current key is greater than (or less than) all previously processed keys in the input stream.

FIG. 11C shows the path search method 1004; it is similar to and uses the same reference numbers as the embodiment disclosed in FIG. 5A of prior U.S. application Ser. No. 136,686 but with changes shown in FIG. 11C which provides absolute memory addressing rather than indexing for accessing rows in directory Z. The overall memory of the computer system is represented by the symbol $m$, which is considered a matrix of rows and is referenced by matrix notation in FIGS. 11C, 13A and 13B.

At the end of execution of step 1004, step 1004a is entered.

Method 1005 is executed to insert a searchable representation of the current key into the directory. This is done in a manner similar to that disclosed in prior U.S. application Ser. No. 136,951, or by the more efficient and preferred technique in FIGS. 13A and B herein.

Initially the directory is empty. When the process has iterated once, there will be one entry in the directoy in addition to a header entry initialized into the beginning of the directory. Each subsequent iteration for another input key inserts a new inner vertex and a new sink into the binary tree directory.

Upon completion of method 1005, it returns processing control to step 1002.

FIG. 11A is preferred for the special case where the input sequence of keys is in sorted sequence, and steps 1001, 1002 and 1003 operate as explained in regard to FIG. 11B. However in FIG. 11A, step 1001 also includes initialization of registers P, C and S by setting each of them to 1. This need not be done in step 1001 in FIG. 11B because registers P, C and S are initialized each time search step 1004 is executed.

However in FIG. 11A, the exit from step 1003 is a direct entry into the insertion method 1006; this avoids the path search method 1004 without providing any corresponding path search function. This avoidance is obtained by taking advantage of a newly discovered characteristic of sorted input keys. The newly discovered relationship requires the insertion point for the new inner vertex to be in the binary tree path identified by the last inserted sink (which represents the prior input key). Accordingly storing the directory indices P, C, and S of the last three vertices on the path to the last inserted sink identifies the path in which the inner vertex insertion must be made for the next key in the sorted sequence. The path can be traced in the backward direction (i.e. from sink to source) with the use of the invertible edges which are provided in the directory with the inner vertices found therein. See the section in this application entitled "SUBTRACTION INVERTIBLE EDGE REPRESENTATIONS" and FIG. 1 for details on how this is accomplished using the preferred subtraction invertible edges.

Upon the completion of execution of method 1006, the processing is returned to step 1002 in FIG. 11A for obtaining the next key in the input sequence and generating a representation of it in the directory. Whenever the iteration to step 1002 finds that the end of the input key sequence has been reached, the NO exit is taken to end the directory generation processing.

INSERTION METHOD FOR EFFICIENTLY HANDLING SORTED KEYS

FIG. 12 illustrates a flow diagram which, together with FIG. 11A generates a directory from a sorted sequence of input keys, or any other sorted information from which a directory is to be constructed. FIG. 12 will not handle unsorted keys.

Certain steps in the method in FIG. 12 may be the same as steps found in FIG. 2B in prior application Ser. No. 136,951, and these steps are given the same reference numbers as found in the prior application which are in the 700 series (they are underlined for emphasis). The other steps in FIG. 12 are given reference numbers in the 600 series. However absolute addressing is used in FIG. 12 to represent the relocation advantages instead of indexing which would require addition of a base address each time a row index is used.

The method in FIG. 12 is entered at step 601 after step 1001 in FIG. 11A has allocated the storage space (beginning at the address in register DAR in FIG. 8) in which the directory is to be constructed and initializes fields and registers in FIG. 8 as required in the process. The allocated storage space for the directory is 2N rows (see FIG. 9), in which N is the number of input keys to be represented. Each row may receive an entry representing a vertex in the directory, and may for example comprise 32 bit positions.

Step 1001 has initially set to zero the "#SINKS" field in row 0 of the directory space, and has inserted chained free space edges in the odd row of each pair of rows (i.e. 1, 3, 5, etc.) and has set the address of directory row 2 into the "space chain field" in row 0 in FIG. 9. Thus row 1 is not on the free space chain and is reserved for the initial sink entry and thereafter for the source entry.

Step 601 is entered to test the "#SINKS" field to determine if the directory is an empty set. If empty, step 602 is entered to insert the address of the first key in row 1, and step 603 inserts a one into the "#SINKS" field. Then the process returns to step 1001 in FIG. 11A to continue the generation process with the next key obtained by step 1003. When step 601 is again entered for the next current key, it finds a one in the "#SINKS" field.

Step 706 then tests the availability of a successor space pair for making the insertions for the current key. If a zero is found in this field, there is no available space and the process ends. If step 706 finds a non-zero in the "#SINKS" space exists then step 707 is entered to obtain the address in the "space chain field" in row 0 in FIG. 9 and load it into register TMP in FIG. 8, which is the assignment of the successor space pair for the current insertion. An initialized edge field in the assigned space pair is then loaded into the "space chain field" to provide for the space assignment for the next key insertion.

During each iteration of the method, step 1003 has read the next key in sorted sequence, and the address of the data record represented by each key is read with each key. When each key and its data record address is read, the key is put in register KEY0 in FIG. 8, and its address is put in register ADR0. Thus step 603 inserted the address of the first key (or a representation of that address) from register ADR0 into the current sink vertex row 1 in the directory space allocated by step 601; this is the first entry made in the directory.

Accordingly in the next iteration of the method in FIG. 11A, step 1002 checks the input stream to see if there is a next key and if it exists, continues the process with step 1003 getting the next key in the sorted sequence and putting it in register KEY0, and putting its address in register ADR0 in FIG. 8, after transferring the contents of ADR0 and KEY0 to ADR1 and KEY1 respectively. Then in FIG. 11A, step 1006 is again entered to begin the next iteration in the method in FIG. 12, which operates as previously explained for steps 706, 707 and 601. Then step 703 is entered.

Step 703 includes substeps 703a and 703b. Substep 703a compares the current key and the last prior key by Exclusive-ORing their content in registers KEY0 and KEY1 using highest-order bit alignment. The new D-index is generated therefrom by substep 703b signalling a binary number which is the bit index of the first unequal bit position in the two comparands, and this binary number is stored in register D in FIG. 8 as the new D-index.

After the new D-index is generated, step 610 is entered in order to trace a backpath in the binary tree in the path identified by the last inserted sink to find the location C for the insertion of a new inner vertex which will contain the new D-index. Step 610 uses the backpath trace method described in FIG. 5A in prior patent application serial number 136,951 in which step 39 is modified to support relocatable absolute addressing with a subtraction invertible edge by being changed to P←S-m[C;EDGE] or P←S-CELL[EDGE] instead of P←S ∀ EDGE. Thus in FIG. 11C, no base address addition is done within the iterations of the path tracing operations. The base address of the directory is handled once, which is during initialization step 25 where the base address in register DAR is provided as an initial component for registers C, S and P.

The backpath trace finds the point of insertion along the path using the ascending path property in which the D-indices in the vertices along the path ascend in the source to sink direction and thereby descend in the opposite direction of sink to source which is followed by the backpath trace. Thus the backpath trace starts at the predecessor of the last inserted sink entry by comparing its D-index with the new D-index. If the predecessor's D-index is greater, the trace goes to the next inner vertex in the backpath, and so on until a vertex is found with a D-index which is not greater than the new D-index, which is the predecessor of the insertion point. Thus the insertion point will be at: (1) the sink entry if only one sink exists in the directory, (2) the sink entry if the new D-index is greater than the D-index at the sink's predecessor vertex, (3) the inner vertex entry encountered before the first inner vertex having a D-index which is not greater than the new D-index, or (4) the source if the new D-index is less than the D-index in the source entry.

Consequently when an inner vertex is encountered with a D-index which is not greater than the new D-index, the new D-index must then be greater than all inner vertices which would later be encountered in the backpath. The backpath trace can end with the vertex having this first not-greater-than D-index, and its successor vertex in the backpath is the vertex to be displaced by a new inner vertex. The displaced vertex becomes a left successor of the new inner vertex for ascending sorted input keys and a right successor for descending sorted keys.

As a result the backpath trace traverses the backpath in the sink-toward-source direction. In the backpath trace, the insertion point cannot be recognized until its predecessor vertex is detected to have the first D-index not greater than the new D-index. This predecessor vertex is at the address in register P and its successor vertex (which is at the address in register C) is the vertex to be displaced by the new vertex to be inserted therein.

In practice, approximately 50% of the backpath insertions will displace the sink, and another 25% wil displace the sinks predecessor vertex, which are the first encountered vertices. (On the other hand, a forward path trace would last encounter these most likely insertion locations.) Consequently, the backpath trace is more efficient (with fewer vertices being traced) and is independent of path length in the binary tree.

Hence the vertex to be displaced in the directory (represented by the address in register C) may be a sink or an inner vertex. If it is an inner vertex, it is the source of a subtree within the binary tree within the directory, i.e. vertex C has a pair of successors, of which either may be an inner vertex. FIG. 4A illustrates a subtree having vertex C which is to be displaced by the insertion to be made. (The backpath contains the vertices in the rightmost path, i.e. H+1, S+1, C and P.) Whether each successor S and S + 1 of an inner vertex in row C is a sink or inner vertex is determined by testing the values of the flag bits $t_0$ and $t_1$ in vertex C. This is done by step 611 in FIG. 12. FIG. 4B shows the subtree after the insertion, in which the inner vertex at row C was moved to the row having its address in register TMP.

The displaced vertex in row TMP is the source of the same subtree as it was before its move. The new inner vertex is inserted into the directory at the row having address C, and the new sink is in row TMP+1. FIG. 5 shows the new content of the assigned successor pair space, in which the left successor is at row address TMP which now contains the displaced vertex, and the right successor is at row address TMP+1 which now contains the new sink, i.e. the address of the current key or a representative thereof.

If step 611 finds the successors of the vertex at address C at addresses S and S+1 to be sinks (i.e. $t_0$ and $t_1$ in C are each 0), the NO exit is taken to step 614 which zeros registers G and H (then zero content indicates there cannot be any successors of G or H, respectively).

Steps 612 and 613 are entered if step 611 finds vertex C has any successor S or S + 1 which is an inner vertex (i.e. $t_0$ or $t_1$ in C is 1). This successor relationship needs to be known when invertible edges are being used, since the addresses of G and H are needed (if they exist) in order to adjust the invertible edges for the immediate successor vertices S and S + 1.

The entries in the directory containing the subtree of C are not moved. Also they are not disturbed in any way if they are sinks. But if any successor of C is an inner vertex, its invertible edge field requires an adjustment, since an invertible edge field changes if either its predecessor or successor index is changed. Steps 612 and 613 determine addresses, S, G and H (when they exist) which will be needed for such invertible edge adjustments by later step 620.

The adjustment requirements are illustrated with the use of FIG. 4B, which shows a subtree having inner vertex successors S and S + 1; this is a worst case condition for invertible edge adjustment. Before the insertion of the new entries at row TMP (i.e. row at the index in register TMP) and before the new sink placement into row TMP+1, the subtree of row C in FIG. 4A will include the vertices at rows S, S + 1, G, G + 1, H and H + 1, of which inner vertices exist at C, S and S +1.

In order to later adjust the invertible edges, required addresses are determined at an appropriate place in the method by steps 612 and 613. This requires the addresses of rows C and P previously determined from the backpath trace in step 610 which located row C as the insertion point. The address in register TMP was previously determined from the space assignment for the new successor pair by step 707 in FIG. 1. Thus in step 612, the address in S is determined by adding the address in P to the edge field in the row at the address in C, i.e. $S = P + m[C;EDGE]$. (Note that row C is not yet displaced.) Then step 613 determines the addresses G and H. Address G is found by adding the content of register C to the edge field at address S, i.e. $C + Z[S;EDGE]$. Likewise address H is found by adding the content of register TMP with the edge field at address S + 1, i.e. $H = C + m[S+1;EDGE]$.

In this manner, step 612 determines the address of vertex S if it is an inner vertex (I.V.); and step 613 determines the addresses of any inner vertices which may exist at G and H. Addresses S, G and/or H are respectively inserted into the content of respective registers S, G and H shown in FIG. 8. If any vertex S, G or H is a sink, or is non-existent, step 613 sets a respective register G or H to zero to represent that there is no inner vertex at the respective vertex location.

Step 716 is entered to move the contents of row C (i.e. the vertex at the index in register C) into the left successor row currently addressed by the content in register TMP. Then step 718 is entered which places a representation of the next key (i.e. its address) into the right-successor row which has an index one greater than the current address in register TMP, i.e. TMP + 1. The result of steps 716 and 718 is shown in FIG. 5.

Then step 721 is entered to displace row C by generating the new inner vertex in row C by (1) inserting the new D-index therein, (2) generating and inserting the new invertible edge, i.e. invertible edge is generated by subtracting the current address value in register P from the current address value in register TMP i.e. $m[C;EDGE] = P-TMP$, (3) inserting the flag bits $t_0 c_0 t_1 c_1$ as $t_0 101$ in which $t_0$ is the $t_0$ flag field in row P which represents the sink/inner vertex status of the left successor (i.e. displaced row C) currently addressed by register TMP, 0 indicating a sink and 1 indicating an inner vertex.

Step 620 adjusts the edge field in the vertices at rows S and S+1 if they are inner vertices. Step 620 is skipped and step 621 is directly entered if neither row S nor S+1 contains an inner vertex, i.e. both contain sinks, or both are non-existent because row TMP contains a sink. An edge field at row S and/or S+1 is adjusted by overlaying its edge field representation with a redetermined edge field representation. The redetermination for row S is done by subtracting the address in TMP from the address in register G, i.e. $m[S;EDGE] = G - TMP$. Similarly the edge field redetermination for row S+1 is done by subtracting the address in register H from the address in register TMP, i.e. $m[S+1;EDGE] = H-TMP$.

Then step 621 is entered which adds one to the content of the "#SINKS" field in the directory header row 0 to reflect the fact that the current entry is completed amd that one more key is represented by the directory generated thus far.

Then step 621 returns to step 1002 to permit the method to reiterate in order to make the insertions for any following keys in the input sequence.

DETAILED FLOW DIAGRAMS OF GENERATION METHOD

The embodiment in FIGS. 13A and B is a detailed adaption of the more general method described with FIG. 12.

Figure 13B:
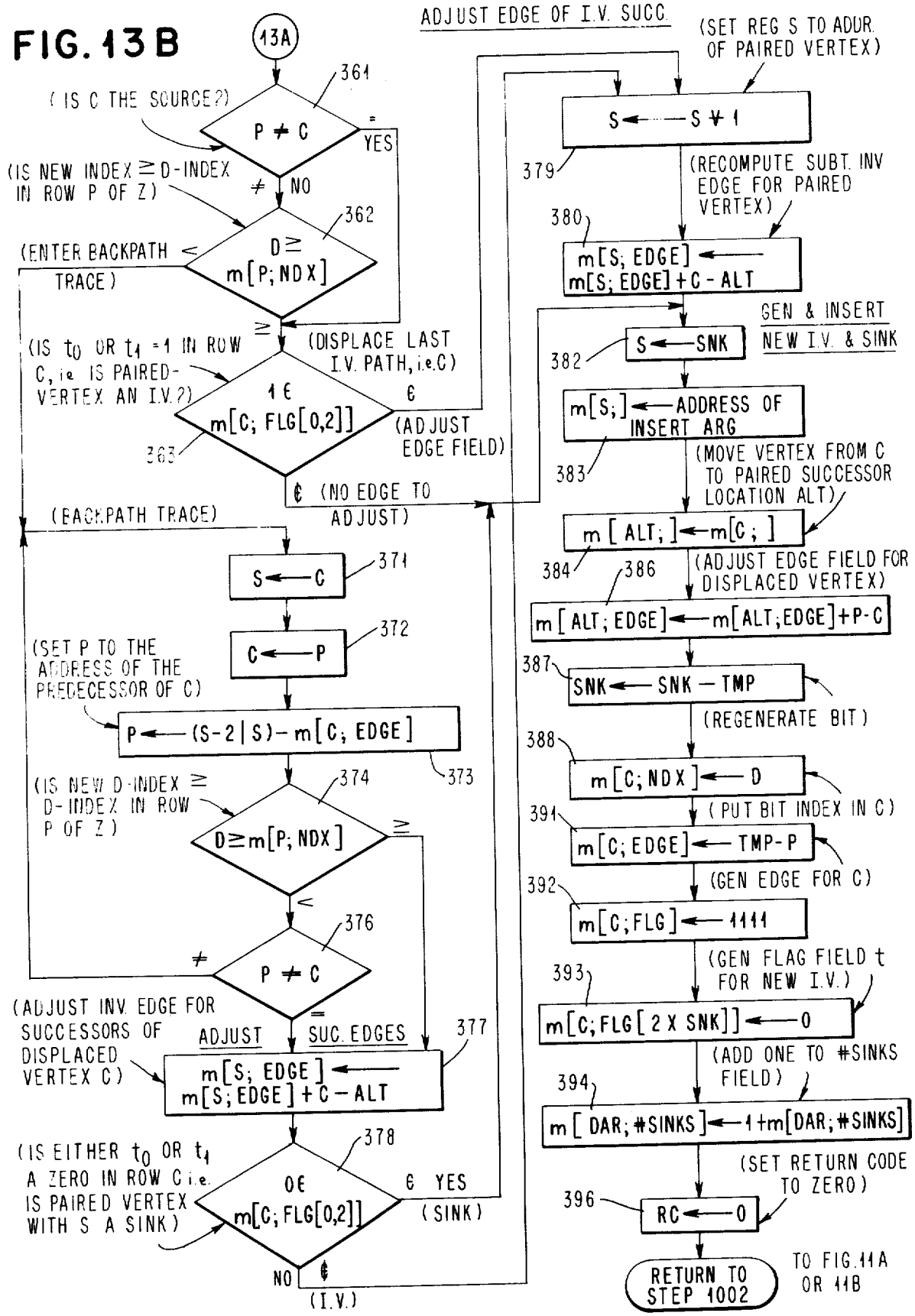

FIGS. 13A and 13B illustrate a detailed flow diagram embodiment entitled INS4 of the generation method invention in a form which can directly be put into the machine code for execution on any data processing machine, such as for example on the IBM S/360 Data Processing System, by a programmer skilled in the art, or put into special hardware by one skilled in the art of implementing algorithms into computer hardware.

The method INS4 is detailed in FIGS. 13A and B to automatically handle input key sequences regardless of whether they are unsorted, or sorted in ascending or descending sequence. In any case, the binary tree represented in the directory will contain the sinks in collating sequence in left list order. The sorting order is automatically provided by the insertion because: in ascending input order, a 1 bit is always found at the D-index bit position in the current key; while in descending input order, a 0 bit is always found at the D-index bit position in the current key. Steps 331 and 332 provide this automatic response as a function of the value of the D-indexed bit (i.e. BIT), so that registers ALT will contain the address of vertex C after it is moved, and register SNK will contain the address of the new sink. Register TMP contains the address of the successor pair space at the addresses in registers ALT and SNK which are the locations for the successor pair of the new inner vertex to be inserted at the original address of vertex C before it is moved. Thus for an ascending input key sequence, ALT will always have the address of a left successor and SNK will always have the address of a right successor. This is reversed for a descending input key sequence, for which SNK will always have the address of the left successor and ALT will always have the address of the right successor. For address computation, the index difference of 1 relating their positions is replaced by the length of a directory row in the addressing units of the memory m.

The fields (or registers), which are used in FIGS. 13A and B, are shown in FIG. 8. The lettering within the fields in FIG. 8 describes the content of the respective field/register.

The functioning of the many of the steps shown in FIGS. 13A and B is represented by comments printed next to and pointing to the respective boxes shown in these FIGURES.

The functioning of the detailed method in FIGS. 13A and B is analogous to the functioning of the general flow diagram shown in FIG. 12. The functional relationship between FIG. 12 and FIGS. 13A and B is shown in the latter by providing therein statements with underlining which begins a series of steps which represent the analogous functions found in FIG. 12.

The content and any additional comment with each step in FIGS. 13A-B is considered to have sufficient clarity to one skilled in the programming arts, or computer system architectural arts, that it would be redundant and would not significantly assist an understanding of the specifications to again provide a laboriously detailed explanation through FIGS. 13A and B in the manner which was done for FIGS. 10A, B and C for inserting each next key in the directory. The operation in FIGS. 10A, B and C can be directly performed by the method in FIGS. 11A, 13A and 13B. The matrix notation within most of the boxes shown in FIGS. 13A and B is described in the preceding section titled "MATRIX FORM and TERMINOLOGY". Conventional commercially used APL notation and operators are used throughout FIGS. 13A and B with the addition of the conventional Exclusive-OR operator $\forall$ in box 379. Thus the left-pointing arrow shown in most of the steps represents a setting of bits in the field or register shown to the left of the arrow, i.e. pointed to by the arrow. For example in step 373 in FIG. 13B, the field to the right of the arrow is (S-(2 | S)) + M[C;EDGE] which represents the acts needed to obtain the address of the next vertex in the backpath trace which is stored into register P; after step 371 puts the address of the successor of the currently encountered vertex in register S and step 372 puts the address of the currently encountered vertex into register C. The required machine acts by step 373 are: accessing the field identified as M[C;EDGE], which is the subtraction invertible edge field in row C in memory m, and summing it with the residue of S modulo 2, and subtracting this sum from the content of register S. The (2 | S) act determines if the index or address S is odd or even (i.e. 0 if odd and 1 if even) which respectively indicates if S is a left or right successor. This subtracts a 1 only if S is a right successor, which adjusts its address to represent its paired left successor, as is required in backpath tracing.

The flag bits $t_0$, $c_0$, $t_1$, $c_1$, indicates certain status conditions for each successor of the vertex containing the flag bits. The subscript 0 indicates each flag bit for the left successor, and the subscript 1 indicates each flag bit for the right successor. That is, $t_0 c_0$ indicates the status for the left successor, and $t_1 c_1$ indicates the status for the right successor of the vertex having the flag bits. Bit $t$ indicates if the successor is a sink or an inner vertex by being an 0 or 1, respectively. Bit $c$ indicates if the successor is in main memory by being 1, or 0 if it is not and therefore must be accessed from an I/O device.

In FIG. 9 flag field $t_0 c_0 t_1 c_1$ exists in each inner vertex entry but not in any sink entry. This flag field is shown in columns 1, 2, 3 and 4 of each inner vertex in matrix $m$.

The embodiment presumes the directory is being generated within a single block, i.e. each vertex being located in the same block Z in main memory $m$. Hence the $c_0$ and $c_1$ flag bits are set to 1 in the described embodiment in FIGS. 13A and B. Steps 356, 392 and 393 set the flag bits.

A backpath trace from sink to source is done using the subtraction invertible edge concepts previously described herein in the prior section entitled "SUBTRACTION INVERTIBLE EDGE REPRESENTATION". The backpath trace provides a more efficient insertion method in practice because most of the time the new inner vertex will replace a sink or its predecessor inner vertex, so that most of the time only one or two vertices need be traced in the backpath. The backpath trace is done by steps 371 through 376.

As shown in FIG. 4B, invertible edges are generated for at least two inner vertices per insertion, including the new inner vertex inserted at location C, and the displaced vertex relocated as a successor in the new successor pair location at the row address provided by the content of register ALT. These edges are generated in steps 386 and 391. Also adjustment may be needed in up to two other existing edges in inner vertex successors of the displaced vertex at addresses S and S+1, i.e. S is the content of register S. These edge adjustments are automatically done in steps 377 through 380 in FIGS. 13B for the two successors S and S+1 when either or both is an inner vertex. Step 378 detects if either or both is a sink for which no edge field and no adjustment is possible.

I/O STORING OF DIRECTORY

The directory may be larger than can be reasonably stored in a single physical block on an I/O device, such as a disk or tape, when the directory is not being used by a computer system. As a result the directory may be broken into sections, each of which may contain a number of rows of the directory. Each section may be written as a separate block on an I/O device. At least the I/O block having the directory source must be read into main memory before a search or update operation can begin. If the search begins before all other blocks are brought into main memory, the $c_0$ and $c_1$ bits in the block to be searched must first be set to 1 to indicate which successor pairs are not in main memory, so that if they are reached by the search, the next required block can be read from I/O into main memory.

The detailed embodiments described herein have used the ascending path property because it is currently the best mode (i.e. it applies to the left to right order of bit decreasing significance in a key). However it is directly apparent to those skilled in the art that the descending path property may instead be used as the equivalent where the reverse bit significance is applicable, which is rare in the U.S.A. but is applicable in countries whose language or numbering system are right to left, i.e. Hebrew, Arabic, etc.. All that is needed to be done to the described embodiments is to reverse the bit significance in generating the D-index and reverse the other less than, greater than relationships in the insertion method.

While the invention has been particularly shown and described with reference to preferred embodiments thereof, it will be understood to those skilled in the art that the foregoing and other changes in form and details may be made therein without departing from the spirit and scope of the invention.

What is claimed is:

1. A system using a computer machine for constructing therein a directory entity having stored sub-groups interconnected into a tree structure which may be used to look-up items called object identifiers, the object identifiers being machine-inputted as sets of digitized electrical signals to be represented in, but not included in, said directory entity, said directory entity formed of inner vertex sub-groups and end-of-path sink sub-groups, each inner vertex sub-group including a connector item and an index-position item, the connector addressing a successor-pair sub-group which contains other inner vertex or sink sub-groups, and the index position item in each inner vertex sub-group identifying a particular digit position in an object identifier, said system comprising

- means for allocating a storage part of an electrically inscribable storage medium, said storage part being available to receive a pair of sub-groups in said directory entity, said storage part having at least two portions for receiving respective sub-groups,
- means for registering in a first register device an address item received from the allocating means for locating said storage part in said machine,
- means for comparing a currently inputted object identifier and a last inputted object identifier to identify their highest-order digit position having unequal digits, a new index position item recorded as the value of the highest order digit position,
- means for sensing the stored state in the inputted object identifier at the highest order digit position located by said comparing means,
- means for tracing a backpath in said directory entity beginning with a sink sub-group last inserted into said directory entity,
- means for locating in said backpath a first existing vertex sub-group having an index position item less than the new index position item provided by said comparing means,
- means for moving the first existing vertex sub-group found by said locating means into a first portion of the allocated storage part which now contains a displaced inner vertex sub-group,
- means for inserting into a second portion of the allocated storage part an address item for locating said object identifier in response to operation by said sensing means, the second portion now containing a new sink sub-group,
- and means for inscribing the new index position item provided by said comparing means and said address item provided by said registering means into the location found for said first existing vertex sub-group by said locating means, said address item being a new connector for the new inner vertex sub-group now contained in the directory entity.

2. A system as defined in claim 1 further comprising means for setting a switch prior to inputting any object identifier to indicate if the sequence of object identifiers to be inputted are in a sorted order.

3. A system as defined in claim 1 for generating an invertible connector for each inner vertex sub-group, comprising the additional steps of
- further means for locating a predecessor vertex sub-group of said first existing vertex sub-group in the backpath, and further means for register the address of said predecessor vertex sub-group,
- further means for moving to a subtraction device in said machine the predecessor address and the address item of the successor vertex in said first register device, the invertible connector being provided at the output of said subtraction device, and
- means for transferring said invertible connector into the new inner vertex sub-group.

4. A system using a computer machine for constructing therein a directory entity having stored sub-groups interconnected into a tree structure in which are represented one or more items called object identifiers, the object identifiers being machine-inputted as sets of digitized electrical signals to be represented in said directory entity, the sub-groups in said directory entity being inner vertex sub-groups and end-of-path sink sub-groups, each inner vertex sub-group including a connector item for connecting the vertex sub-group to successor vertex sub-groups and an index position item for selecting a particular digit in an inputted object identifier, said system comprising
- means for forming an invertible connector signal in a subtraction device as a difference between an address used for directly locating vertices which are adjacently preceding and succeeding a given inner vertex in a connected path in said directory entity, and
- means for transmitting said invertible connector signal to said given inner vertex and storing it therein to form the subtraction invertible connector item for said inner vertex sub-group in a path including the succeeding, given, and preceeding vertices.

* * * * *